United States Patent [19]

Gromov et al.

[11] 4,076,984
[45] Feb. 28, 1978

[54] INTROSCOPE

[76] Inventors: Jury Vasilievich Gromov, 9 ulitsa Sokolinoi gory, 3, kv. 61, Moscow; Boris Ivanovich Leonov, Oktyabrasky prospekt, 164, kv. 53; Oleg Petrovich Smirnov, 115 kvartal, ulitsa Jubileinaya, 17, kv. 48, both of Ljubertsy Moskovskoi oblasti; Nikolai Nikolaevich Smirnov, ulitsa Demyana Hednogo, 20, korpus 5, kv. 12, Moscow; Ljudmila Lavrentievna Nagornaya, ulitsa Danilevskogo, 31, kv. 6; Yakov Abramovich Zakharin, ulitsa Ekonomicheskaya, 14, kv. 59, both of Kharkov, all of U.S.S.R.

[21] Appl. No.: 699,074

[22] Filed: Jun. 23, 1976

[51] Int. Cl.² .............................................. G03B 41/16
[52] U.S. Cl. .................................. 250/367; 250/368; 250/416 TV
[58] Field of Search ........ 250/367, 368, 369, 416 TV, 250/486

[56] References Cited
U.S. PATENT DOCUMENTS 3,824,399  7/1974  Bjork ........................... 250/416 TV 3,982,128  9/1976  Groch ................................. 250/367

Primary Examiner—Craig E. Church
Attorney, Agent, or Firm—Lackenbach, Lilling & Siegel

[57] ABSTRACT

An introscope is disclosed wherein penetrating radiation passes through a test object with reference marks set thereon and enters an main and an additional fluoroscopic converters, which transform the penetrating radiation into main and additional fluxes of visible light carrying information on the shadow interior of the test object. One of said fluxes, the main one, after being reflected from a main mirror, is transmitted to a photocathode of an image converter and after amplification of the light therein is transmitted to a photocathode of a pickup tube of a closed-circuit television system, whereas the other of said fluxes, the additional one, is reflected from an additional mirror and is transmitted to a cinema recorder. The luminescence spectrum of the additional fluoroscopic converter is different from the luminescence spectrum of the main fluoroscopic converter. The monitor screen of the closed-circuit television system and the film of the cinema recorder show a picture of the interior of the test object, the image on the monitor screen being corrected through the use of the reference marks on the film image.

37 Claims, 42 Drawing Figures

INTROSCOPE

This invention relates to a branch of applied physics, namely non-destructive testing, and more specifically to devices for radiological introscopy and, in particular, to introscopes. It can be used in various fields: metallurgy, machine building, chemical, aircraft and ship-building industries to control welding, casting, rolled steel, as well as in medicine for radiodiagnosis, gammascopy, control of braking radiation, gamma beam alignment during therapy.

Introscopes currently employ: powder polycrystal X-ray or alkali-halide monocrystal screens with a diameter of 200-350 mm, solid-state electroluminescence and electronoptical intensifiers of X-ray image, solid-state electroluminescence light intensifiers and image converters, high-power reflector lenses, television equipment for element by element scanning in 625 to 1,000 lines and interlaced scanning, low-noise broad-band amplifiers, highly sensitive pick-up tubes, units for photo or cinema recording of the television image, video and recorders (cf. e.g. R. Halmshaw, Physics of Industrial Radiology, Heywood Books, London, 1966).

Introscopes used for medical purposes comprise an X-ray tube placed near an X-ray transparent table deck for a patient and a fluorescent (mostly powder) screen positioned downstream of the radiation and behind the patient.

Direct observation of an X-ray shadow image on a fluoroscent screen (fluoroscopy) tends to develop in two directions.

The first trend aims to achieve the maximum possible brightness and sets relatively moderate requirements to image sharpness. This can be explained by the fact that fluoroscopy is the only method of watching a direct X-ray image of a moving object. This method is employed both in medicine and in industry to test articles for correct assembly. In this case a powerful X-ray tube is used, the distance between the screen and the tube focus being short and a test item (or patient) being placed near the screen.

The second trend aims to provide the maximum enlargment of an image. To this end a sharp focused X-ray tube is used and a test object is placed at such a distance from the screen that it is projected thereon and enlarged many times. This image magnification makes up for a drastic decrease in the picture sharpness. But employment of a sharp focus X-ray tube results in diminished power and, consequently, worse image brightness. Dark adaptation, therefore, becomes a necessity for an observer on fluoroscopy.

The interest in medical and industrial applications of fluoroscopy was boosted with the invention of various optical image intensifiers and particularly when closed-circuit television systems came into usage.

Television provided complete safety with the employment of X-ray equipment, gamma sources, and sources of braking radiation. Television permitted viewing an image from a close distance. Its employment made practically unlimited enlargement of an optical image possible, irrespective of the signal-noise radio, and, consequently, viewing of an image at a high level of brightness which ensured at all stages of image transfer from a fluoroscopic screen a high degree of contrast and brightness. With television dark adaptation becomes superfluous. Television image transmission permits the employment of special methods to improve picture quality, e.g. noise reduction, introduction of contrast control into a television channel. Television image transmission permits photographing and filming, as well as preservation and replay through the use of a video recorder.

An image converter with high-power reflecting and lens optics used as an intermediate element between a fluoroscopic screen and a pick-up television tube enables television equipment to be simplified, more reliable and allows cheaper vidicons to be employed and high level of image brightness to be retained.

Studies were conducted lately on a large scale to substitute polycrystal powder fluorescent screens, which are ineffective at radiation energies from 0.15 to 0.30 MeV, for thick mono-crystal alkali-halide screens made of CsJ (T1) and CsJ (Na), which ensure more intense brightness and higher resolution at the moment of conversion of a shadow X-ray, gamma image into a visible optical image. It is proposed to employ solid-state electroluminescent X-ray image intensifiers in the energy range of up to 150 KeV instead of powder X-ray screens.

Modern introscopes thus comprise a gamma-optical fluoroscopic converter which is a thin polycrystal powder X-ray screen or a thick alkali-halide monocrystal scintillating screen or a solid-state electroluminescent X-ray image intensifier, high-power reflector lenses, an image converter and a closed-circuit television system.

Known X-ray television introscopes operate as follows. Radiation generated by a source (gamma emitter, X-ray unit, charged-particle accelerator) passes through a test object and comes to a fluoroscopic converter, which is a monocrystal scintillating screen placed in an input conversion unit comprising in addition to the converter a coated mirror, high-power reflector lenses, an image converter, a pickup tube and a video signal preamplifier. A shadow picture obtained by penetrating radiation is converted by a scintillating monocrystal screen into visible light. The optical image is projected from the scintillating screen by the use of high-power reflector lenses successively to a photocathode of the image converter and then to the photocathode of the pickup tube of the closed-circuit television system (when preliminary intensification of light is superfluous, the image is projected directly from the scintillating monocrystal screen to the photocathode of the pickup television tube). After the image is intensified and processed in the television channel, it is displayed in front of the operator on the television screen of the monitor comprising in addition to the monitor itself a television image parallel cinema recording unit, video recorder, a unit for remote control of tilter rollers with a test object being placed thereon and of the penetrating radiation source operation.

Though highly sophisticated equipment is currently employed for the purpose, known introscopes still lack high quality image transfer from the scintillating monocrystal screen. Loss of information can be attributed to the fact that the image is recorded from the monitor screen only. The image converter and television system add some noise due to their equipment production technology and they set a certain threshold contrast for the image converter and television system separately and for the introscope as a whole.

When an image is recorded from the monitor screen only, the operator is always inconvenienced in that he is always nervous about missing a minor flaw.

A video recorder permits a slow-down of the replay but the noise added by the threshold noise of the video recorder becomes still larger and the picture is somewhat blurred. Besides, video recorders are expensive and complicated to manufacture.

The image is recently often cinema recorded from an additional kinescope placed in the unit for parallel cinema recording of the television image of the control board, but this does not reduce the noise acquired earlier in the image converter and television system.

Thus known introscopes are deficient in that they possess low sensitivity due to the loss of information in the image converter and television channels. In addition, known introscopes do not ensure an adequate reliability of control due to the operator's fatigue which is inevitable when observing countless minute flaws.

It is an object of this invention to provide an introscope possessing a higher sensitivity.

Another object of this invention is to provide an introscope possessing a higher reliability of operation.

This is achieved by an introscope, wherein penetrating radiation from a radiation source passes through a test object with reference marks set thereon and comes to a fluoroscopic converter transforms the penetrating radiation into a flux of visible light carrying information on the shadow interior of a test object. The flux of visible light is reflected from a mirror and is transmitted to a photocathode of an image converter and after being amplified therein is transmitted to a photocathode of a pickup tube of a closed-circuit television system, its monitor television screen recording the shadow image of the interior of the test object. An additional fluoroscopic converter is, according to the invention, provided, its spectrum of luminescence being different from the spectrum of luminescence of the main fluoroscopic converter, and is positioned parallel to the main converter so that the penetrating radiation comes therein to be also transformed into an additional flux of visible light carrying information on the shadow interior of the test object. An additional mirror is positioned relative to the additional fluoroscopic converter so that it receives the additional flux of visible light; and a cinema recorder is positioned so that it receives the additional flux of visible light reflected from the additional mirror, its film records the shadow interior of the object under study which serves to correct through the use of the reference marks the shadow interior of the object under study on the television screen of the monitor of the television system.

Substrates of the main and additional fluoroscopic converters may be in contact.

It is advisable that substrates of the main and additional fluoroscopic converters be made as one common substrate.

Each substrate is preferably made of lead or tungsten or uranium so that their total thickness is equal to the path length of electrons produced in metal under the influence of penetrating radiation.

To record color image it is advisable to employ as a common substrate a scintillating monocrystal screen acting as one more additional fluoroscopic converter with a spectrum of luminescence other than the spectra of luminescence of the main and the first additional screens.

Surfaces of the main and additional mirrors may be in contact, which makes it possible to vary the introscope dimensions without changing the sizes of the fluoroscopic screens.

The main and additional mirrors are preferably made integral as a common mirror with two reflecting surfaces.

The main and additional mirrors are preferably positioned at an angle of 45° to the substrates or the common substrate of the main and additional fluoroscopic converters respectively.

It is expedient to make the main and additional fluoroscopic converters integral as a common fluoroscopic converter with two optically transparent outlet windows, which makes the design and manufacture of the introscope simpler.

It is also quite expedient to make the main and additional fluoroscopic converters as scintillating monocrystal screens placed in containers which are at the same time substrates of these converters.

The main and additional fluoroscopic converters may also be made as X-ray polycrystal screens applied on the substrates.

To increase image brightness and contrast even on the fluoroscopic screens with the penetrating radiation energy reaching 150 KeV, it is advisable to make the main and additional fluoroscopic converters as solid-state electroluminescent X-ray image intensifiers.

It is also expedient that one of the fluoroscopic converters, the main one or the additional one, be made as a scintillating monocrystal screen and the other, the main one or the additional one, as an X-ray polycrystal screen.

It is also advisable that one of the fluoroscopic converters, the main one or the additional one, be made as a scintillating monocrystal screen, and the other, the additional one or the main one, as a solid-state electroluminescent X-ray image intensifier.

It is quite reasonable to make one of the fluoroscopic converters, the main or the additional one, as an X-ray poly-crystal screen and the other, the additional or the main one, as a solid-state electroluminescent X-ray image intensifier.

Each of the fluoroscopic converters, both the main one and the additional one, may be made as an X-ray polycrystal screen and a solid-state electroluminescent light amplifier, the luminophore layer of the X-ray screen being in contact by all of its surface with the surface of the optically transparent electrode contacting the light-sensitive photosemiconductor layer of a solid-state electroluminescent light amplifier.

It is reasonable to make each of the fluoroscopic converters, both the main and the additional one, as a solid-state electroluminescent light amplifier, its optically transparent electrode, which is in contact with a light-sensitive photosemiconductor layer, being coated successively by an electrophotoluminescent layer and an optically resistant electrode.

To increase the efficiency of the introscope recording unit on gamma and braking radiation of up to 1–30 MeV, it is advisable that the common fluoroscopic converter be made as two solid-state electroluminescent light amplifiers, their optically transparent electrodes being in contact with light-sensitive photosemiconductor layers, and that between said electrodes a screen is placed made of fibres arranged in the direction of penetrating radiation propagation and scintillating under its impact.

The common fluoroscopic converter may also be made as two solid-state electroluminescent light amplifiers, their optically transparent electrodes being in contact with light sensitive photosemiconductor layers, with two fibre-glass screens placed between said electrodes and a monocrystal scintillating screen being placed between said screens.

It is quite reasonable to make the common fluoroscopic converter as two optically transparent electrodes with two layers of electroluminophor placed therebetween and an X-ray sensitive photoresistor layer placed therebetween.

The common fluoroscopic converter may be made as two scintillating monocrystal screens with different spectra of luminescence and an X-ray polycrystal screen placed therebetween and in contact with the monocrystal screens.

It is advisable that the main fluoroscopic converter be made as at least one scintillating monocrystal screen with two optically transparent inlet and outlet windows which permit recording both the shadow image of the interior of the test object on the monitor television screen or the film of the cinema recorder.

It is advisable that the additional fluoroscopic converter comprise at least one scintillating monocrystal screen which can ensure color image on the film of the cinema recorder.

The additional fluoroscopic converter may additionally comprise a solid-state electroluminescent X-ray image amplifier, its optically transparent electrode being in contact with a scintillating monocrystal screen.

Such design of an introscope, according to the invention increases its sensitivity, permits obtaining a larger amount of information, ensures greater reliability of testing due to computerized interpretation of the film or its thorough investigation by an operator, preserving of test results for a longer period of time as filmed roentgenograms and obtaining exact information as to the location of a defect both inside the test object and on its visible external surface.

The invention will now be described with reference to specific embodiments thereof in conjunction with the accompanying drawings, wherein.

Figure 1:
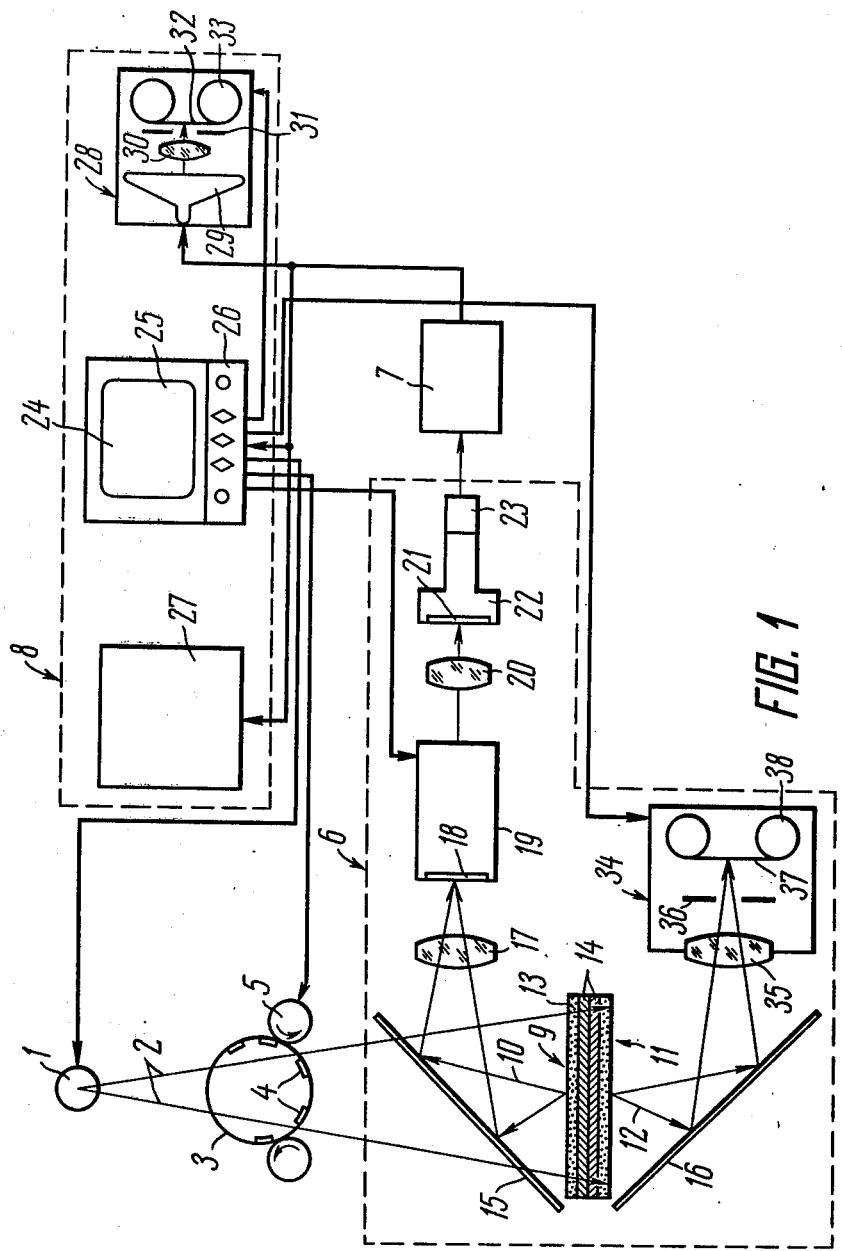
FIG. 1 is a schematic view of an introscope with an object being tested, according to the invention.

An introscope comprises, according to the invention, a source 1 (FIG. 1) of penetrating radiation 2, e.g. a source of gamma radiation, the radiation passing through a test object 3 shaped as a tube with reference marks 4 made as digits, letters or fault meters set thereon and shown as rectangles in the drawings. The test object 3 is moved by means of rollers 5 of a tilting device. Lead digits, letters and fault meters are preferably placed on the surface of the tube not in contact with the rollers of the tilter and facing an input conversion unit 6 of the introscope which receives the penetrating radiation after it passes through the test object 3. The introscope also comprises, according to the invention, a unit 7 of intermediate video signal amplification and processing connected to the output of the input conversion unit 6 and a control board 8 connected to the output of the unit 7.

The input conversion unit 6 comprises a main fluoroscopic converter 9 which transforms the penetrating radiation 2 into a main flux 10 of visible light carrying information on the shadow interior of the test object 3 (optical image), and an additional fluoroscopic converter 11, its spectrum of luminescence being different than the spectrum of luminescence of the main fluoroscopic converter 9, positioned parallel to the main converter 9 so that it also receives the penetrating radiation 2, said converter 11 transforming said penetrating radiation 2 into an additional flux 12 of visible light carrying information on the shadow interior of the tested object 3 (optical image).

In this embodiment of an introscope the main fluoroscopic converter 9 (FIG. 2) and the additional converter 11 are made as X-ray polycrystal screens 13 applied on substrates 14. The substrates 14 in this embodiment are made from lead and their total thickness is equal to the path length of electrons produced in the metal under the influence of the penetrating radiation 2 (FIG. 1) of the source 1. The substrates 14 are in contact with one another. They may be made from tungsten or uranium, but in such a case their total thickness should still be equal the path length of electrons.

The input conversion unit 6 (FIG. 1) also comprises a main mirror 15 and an additional mirror 16 arranged at an angle of 45° to the substrates 14 of the main and additional fluoroscopic converters 9 and 11 respectively.

The main mirror 15 reflects the flux 10 of visible light and directs it through a reflector lens 17 to a photocathode 18 of an image converter 19 (made as described in the collection of articles Cascade Umage Converters and Their Employment, edited by M. M. Butslova, MIR Publishers, Moscow, 1956, pp. 54–84). After being amplified in the converter 19 the flux 10 is directed through a high-power objective 20 to a photocathode 21 of a pickup tube 22 (made as described in Television Equipment, by A. M. Khalfin, Energia Publishers, Leningrad, 1971, pp. 106–117) of a closed-circuit television system, which also comprises a video signal preamplifier 23, the unit 7 of intermediate video signal amplification and processing and the control board 8 (the closed circuit television system is made as described in the above mentioned book by Khalfin, pp. 210–223).

The control board 8 comprises a monitor display unit 24, equipped with a monitor television screen 25 and connected to the output of the unit 7 of intermediate video signal amplification and processing, and a unit 26 of remote control for controlling the source 1 of radiation, the rollers 5 of the tilter and the image converter 19. The control board 8 also comprises a video recorder 27 and an unit 28 of parallel cinema recording of the television image. The monitor screen 25 of the monitor display unit 24 shows a shadow image of the interior of the tested object 3.

The unit 28 includes a kinescope 29 and successively positioned downstream of the visible light flux an apertured lens 30, a shutter 31, a film 32 and a film transporting mechanism 33. Rewinding of the film 32 and control of the shutter 31 is effected by frames automatically by the remote control unit 26.

The additional mirror 16 in the input conversion unit 6 is set at an angle of 45° in relation to the additional fluoroscopic converter 11 so that the additional flux 12 of visible light comes thereto.

The input conversion unit 6 also comprises a cinema recorder 34 placed so that the additional flux 12 of visible light reflected from the additional mirror 16 enters therein. The cinema recorder 34 comprises successively positioned downstream of the flux 12 of visible light an apertured reflector lens 35, a shutter 36, remotely controlled by the unit 26, and a film 37 with a distance-controlled film transporting mechanism 38 operated by frames automatically by the unit 26.

Figure 3:
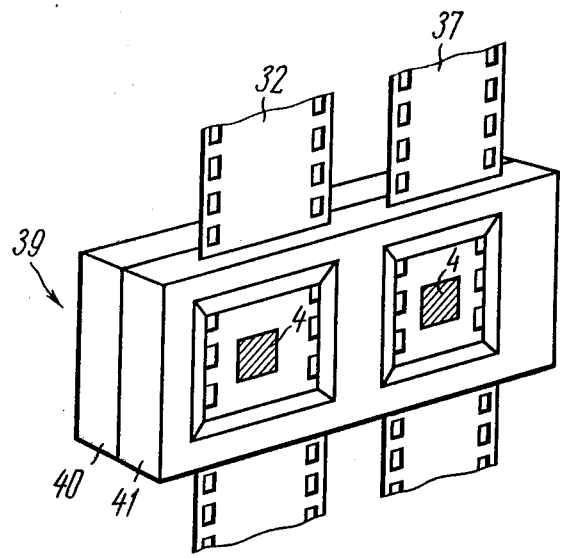
FIG. 3 is a perspective view of a device for image matching of a test object on films of a cinema recorder of an input conversion unit and a unit for parallel cinema recording of a television image of a closed-circuit television system, which is a part of the introscope set, according to the invention.

A shadow image of the interior of the tested object 3 is recorded on the film 37 of the cinema recorder 34. Since it is not distorted by the noises of the image converter 19 and the pickup tube 22, it serves to correct with the help of the reference marks 4 the shadow image of the interior of the test object 3 on the television screen 25 of the monitor display unit 24. To this end there is a device 39 (FIG. 3), for matching the image of the test object 3 (FIG. 1) on the film 32 obtained from the television screen 25 of the monitor display unit 24 with the image obtained on the film 37 of the cinema recorder 34 with the help of the reference marks 4, comprising an illuminator 40 (FIG. 3) and a framer 41.

The above described introscope permits an increase of its sensitivity (and more reliable testing) due to the reduction of image noises when comparing the images of a test object. The main and additional fluoroscopic converters made as polycrystal X-ray screens with contacting substrates are more effective in recording X-rays, gamma and braking radiation within the energy range of about 0.3–30 MeV.

Figure 4:
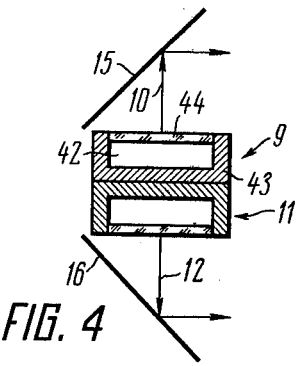
FIG. 4 shows main and additional mirrors and the embodiment of main and additional fluoroscopic converters wherein their substrates are in contact, according to the invention.

Referring to FIG. 4 the main fluoroscopic converter 9 and the additional converter 11 of the introscope are, in accordance with the invention, made as scintillating monocrystal screens 42 placed in containers 43 which serve at the same time as contacting substrates and feature optically transparent outlet windows 44. Such design of the main and additional converters increases the effectiveness of recording penetrating radiation within the energy range of about 0.2–30 MeV.

Figure 2:
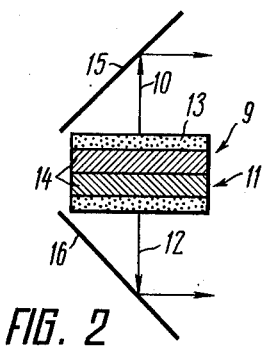
FIG. 2 shows main and additional mirrors and main and additional fluoroscopic converters of the introscope of FIG. 1, according to the invention.
Figure 5:
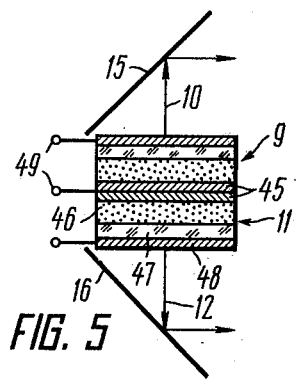
FIG. 5 shows another embodiment of main and additional fluoroscopic converters for the introscope of FIG. 1, according to the invention.

When the radiation energy is up to 150 KeV, an introscope is, according to the invention, preferably provided with the main fluoroscopic converter 9 (FIG. 5) and the additional converter 11 made as solid-state electroluminescent X-ray image amplifiers, their non-transparent electrodes 45 being in contact with each other and being coated successively by a layer 46 of an X-ray sensitive photosemiconductor and a layer 47 of electroluminophor. The converters 9 and 11 also have a transparent electrode 48. Terminals 49 are used to connect the solid state electroluminescent X-ray image amplifiers to a controlled power source (not shown) located in the remote control unit 26 (FIG. 1).

Such design of an introscope permits, according to the invention, not only transformation of X-rays into visible light by intensification of the latter to a required value. This considerably facilitates recording of the image on the film 37 of the cinema recorder 34 and its high-quality transmission by the image converter 19 and the pickup tube 22.

The non-linear radiation-light characteristic of a solid-state electroluminescent X-ray image amplifier contributes to increasing the optical image contrast at the output of the converter and, consequently, to increasing the sensitivity of the introscope as a whole.

The proposed introscope can successfully employ other embodiments of contacting fluoroscopic converters, such as those illustrated in FIGS. 6–10.

Figure 6:
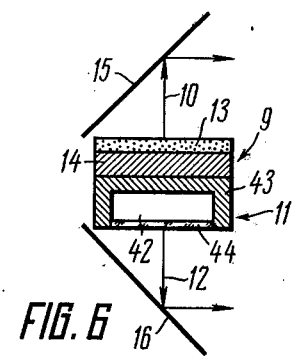
FIGS. 6-10 shows various embodiments of main and additional fluoroscopic converters for the introscope of FIG. 1, according to the invention.

Referring to FIG. 6, the main fluoroscopic converter 9 is made as an X-ray polycrystal screen with the substrate 14, whereas the additional converter 11 is made as a scintillating monocrystal screen 42 placed in the container 43 and having the optically transparent outlet window 44. In this embodiment of an introscope the substrate 14 contacts the container 43.

In another embodiment of an introscope the main fluoroscopic converter may be made as a scintillating monocrystal screen and the additional converter as an X-ray polycrystal screen.

The introscope and converters of FIG. 6 may be effectively used as a device for remote centering of the pathologic focus of a patient in relation to a high-energy therapeutic source of ionizing radiation in the process of therapy.

Figure 7:
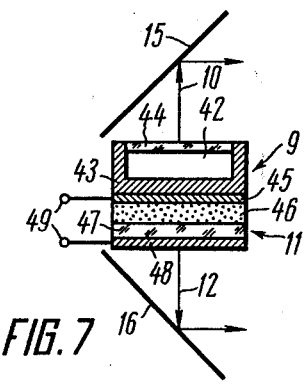

Referring to FIG. 7, a part of the input conversion unit 6 of the introscope of FIG. 1 comprises the mirrors 15 and 16 and the main fluoroscopic converter 9 and the additional converter 11. The main converter 9 is made as a scintillating monocrystal screen 42 in the container 43 with the optically transparent outlet window 44. The additional converter 11 is made as a solid-state electroluminescent X-ray image amplifier, its non-transparent electrode 45 being in contact with the container 43. The reverse arrangement of converters is also possible.

The introscope equipped with the input conversion unit illustrated in FIG. 7 is effective both in medicine and in industry.

Figure 8:
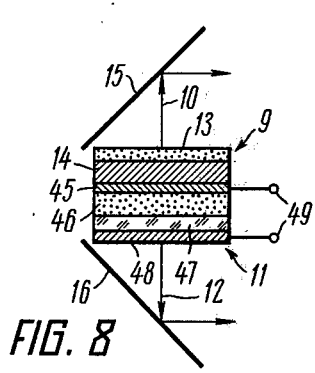

Referring to FIG. 8, a part of the input conversion unit 6 of the introscope of FIG. 1 comprises the mirrors 15 and 16 and the fluoroscopic converters 9 and 11 made up of respectively the X-ray polycrystal screen 13 and a solid-state electroluminescent X-ray image amplifier, its non-transparent electrode 45 being in contact with the substrate 14 of the screen 13. The reverse arrangement of converters is also possible.

Figure 9:
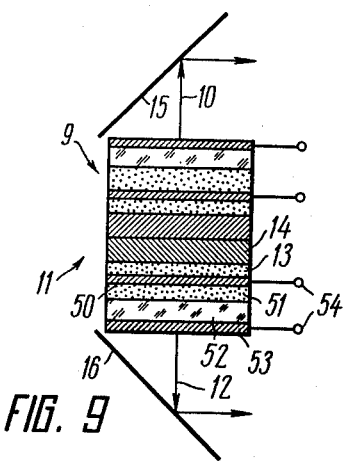

Referring to FIG. 9 a part of the input conversion unit 6 of the introscope of FIG. 1 comprises the mirrors 15 and 16 and the fluoroscopic converters 9 and 11.

Each of the fluoroscopic converters 9 and 11 is made of an X-ray polycrystal screen 13 with the substrate 14 and a solid-state electroluminescent light amplifier. In this case the luminophor layer of the X-ray screen 13 is in contact with an optically transparent electrode 50 contacting a light-sensitive photosemiconductor layer 51 of the solid-state electroluminescent light amplifier. The outer surface of the photosemiconductor layer 51 is in contact with a electroluminophor layer 52, which has its other surface in contact with the surface of an optically transparent electrode 53. Terminals 54 connect the solid-state electroluminescent light amplifier to a controlled power source (not shown) placed in the remote control unit 26 (FIG. 1).

Figure 10:
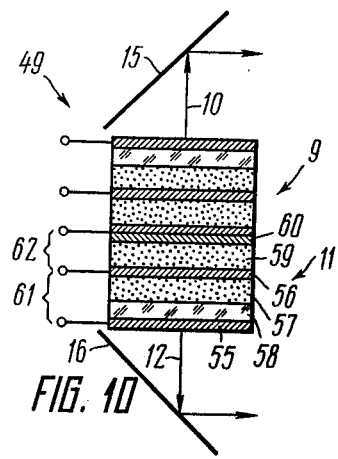

Referring to FIG. 10, a part of the input conversion unit 6 of the introscope of FIG. 1 comprises the mirrors 15 and 16 and the fluoroscopic converters 9 and 11, each converter being made as a solid-state electroluminescent light amplifier (made up of optically transparent electrodes 55 and 56 and a photosemiconductor layer 57 and an electroluminophor layer 58 in contact with said electrodes and each other, its optically transparent electrode 56, which is in contact with the photosemiconductor layer 57, being coated successively by an electrophotoluminescent layer 59 and light-tight electrode 60. Terminals 61 and 62 connect respectively the solid-state electroluminescent light amplifier and the light-tight electrode 60 with a controlled power source (not shown) placed in the unit 26 (FIG. 1).

Another embodiment of an input conversion unit 6 (FIG. 11) of an introscope comprises, according to the invention, a main fluoroscopic converter 63 and an additional converter 64 spaced somewhat apart and intended to convert penetrating radiation into an optical image. In this case the surfaces of a main mirror 65 and an additional mirror 66 are in contact and set at an angle of 45° to the converters 63 and 64. A cinema recorder 34 and an image converter 19 with a pickup tube 22 are positioned on opposite sides of the mirrors 65 and 66.

Figure 12:
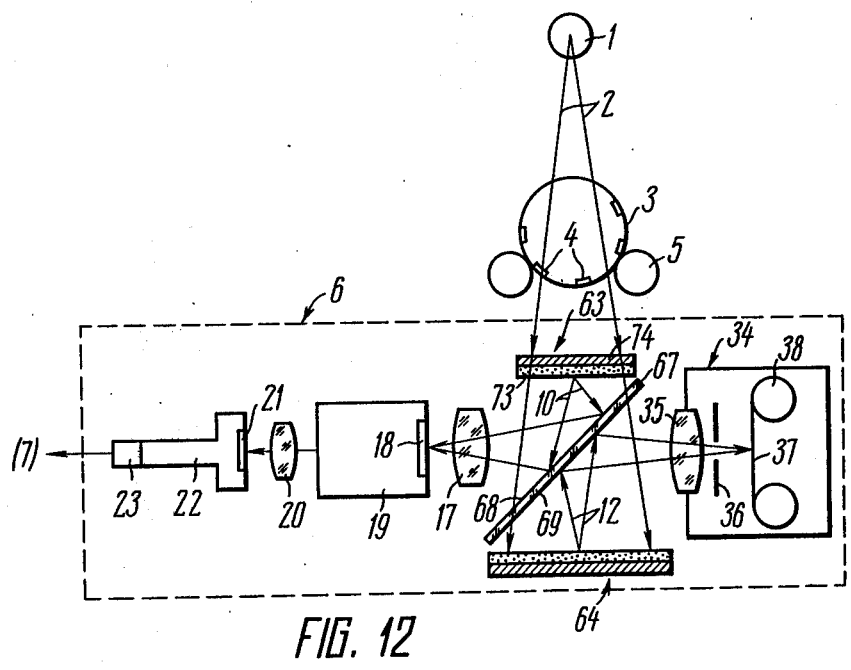
FIG. 12 is a schematic view of another embodiment of an input conversion unit of an introscope, according to the invention.

Referring to FIG. 12, another embodiment of an introscope comprises, according to the invention, main and additional mirrors made as one common mirror 67 with two reflecting surfaces 68 and 69 set at an angle of 45° to the converters 63 and 64. The cinema recorder 34 is positioned to the right of the mirror 67 (in the drawing plane) and the other components of the input conversion unit are positioned to the left thereof. Such arrangement of components of the conversion unit is quite feasible for all embodiments of an introscope, according to the invention, and is within the scope of the invention.

The introscope designed in FIG. 12 permits a reduction of the cross size of the input conversion unit 6 of the introscope, which is vital in testing small-diameter pipes, for example. The embodiment of the input conversion unit 6 illustrated in FIG. 1 is preferably used to test butt welds.

Figure 11:
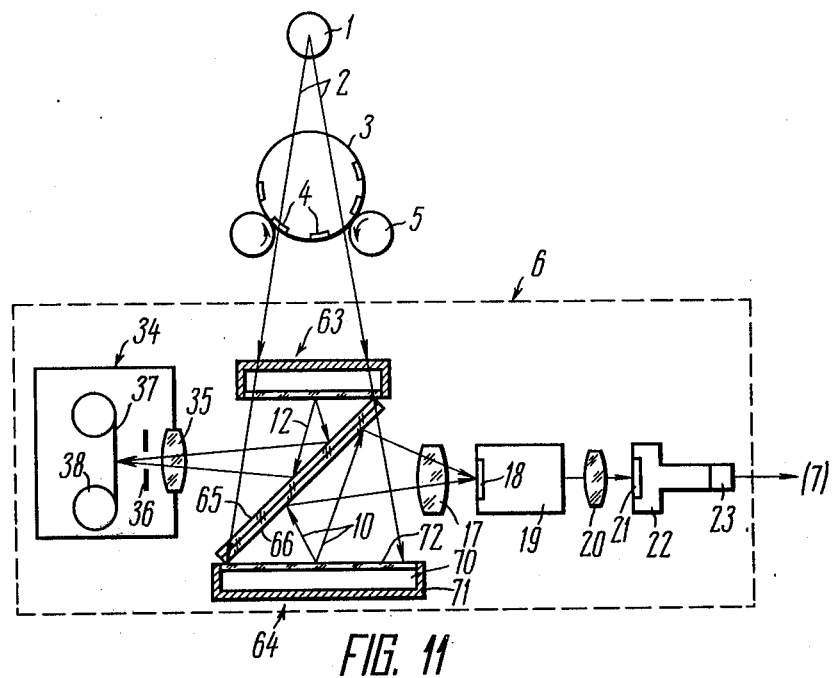
FIG. 11 is a schematic view of one of the embodiments of an input conversion unit of an introscope, according to the invention.

In the introscope illustrated in FIG. 11 the main fluoroscopic converter 63 and the additional converter 64 are made as scintillating monocrystal screens 70 (FIG. 13) placed in containers 71 featuring optically transparent inlet windows 72.

In the introscope illustrated in FIG. 12 the main fluoroscopic converter 63 and the additional converter 64 are made as X-ray polycrystal screens 73 (FIG. 14) applied on substrates 74.

Referring to FIGS. 15-20, various embodiments of the main and additional fluoroscopic converters may be successfully used in the introscopes of FIGS. 11 and 12. For simplicity these converters are only illustrated for the embodiment shown in FIG. 12.

Figure 13:
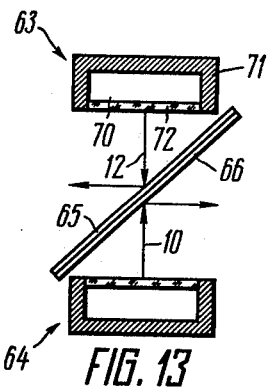
FIG. 13 shows contacting main and additional mirrors and fluoroscopic converters of the introscope of FIG. 11, according to the invention.
Figure 14:
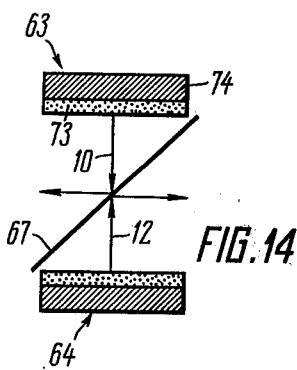
FIG. 14 shows a common mirror and main and additional fluoroscopic converters of the introscope of FIG. 12, according to the invention.
Figure 15:
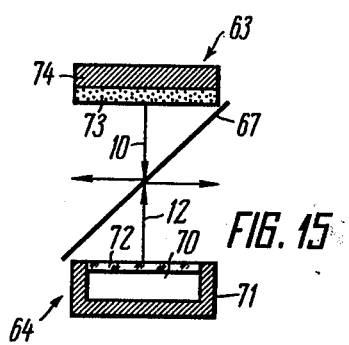
FIGS. 15-20 show various embodiments of main and additional fluoroscopic converters of the introscope of FIGS. 11 and 12, according to the invention.

Referring to FIG. 15, a part of the input conversion unit 6 of the introscope of FIG. 12 comprises a common mirror 67 and fluoroscopic converters 63 and 64 set at an angle of 45° to the mirror, the converter 64 being a scintillating monocrystal screen 70 as in FIG. 13 and the converter 63 being an X-ray polycrystal screen 73 as in FIG. 14.

Figure 16:
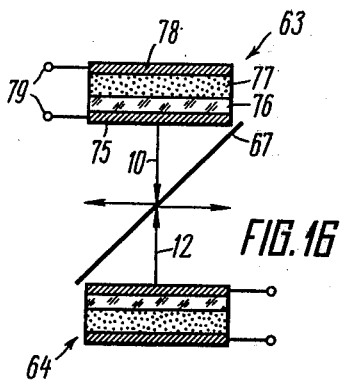

Referring to FIG. 16, a part of the input conversion unit 6 of the introscope of FIG. 12 comprises a common mirror 67 and fluoroscopic converters 63 and 64 set at an angle of 45° to said mirror, each of the converters being made as a solid-state electroluminescent X-ray image amplifier composed successively of a transparent electrode 75, an electroluminophor layer 76, an X-ray sensitive photosemiconductor layer 77, and a non-transparent electrode 78. Terminals 79 connect the solid-state electroluminescent X-ray image amplifier to a controlled power source (not shown) placed in the remote control unit.

Figure 17:
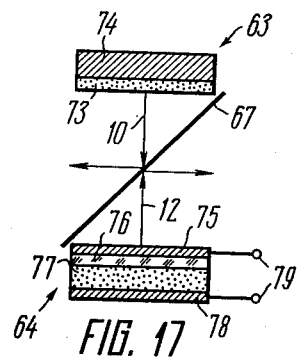

Referring to FIG. 17, a part of the input conversion unit 6 of the introscope of FIG. 12 comprises a common mirror 67 and fluoroscopic converters 63 and 64 set at an angle of 45° thereto, the converter 63 being an X-ray polycrystal screen 73, as shown in FIG. 14 and the converter 64 being a solid-state electroluminescent X-ray image amplifier, as shown in FIG. 16.

Figure 18:
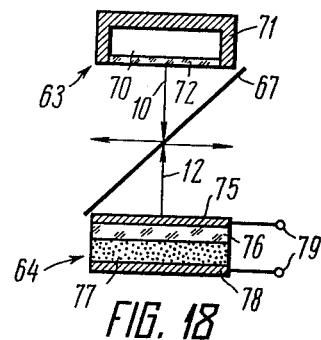

FIG. 18 depicts a part of the input conversion unit 6 of the introscope of FIG. 12 comprising a common mirror 67 and fluoroscopic converters 63 and 64 set at an angle of 45° thereto, the converter 63 being a scintillating monocrystal screen 70, as shown in FIG. 13, and the converter 64 being a solid-state electroluminescent X-ray image amplifier as in FIG. 16.

Figure 19:
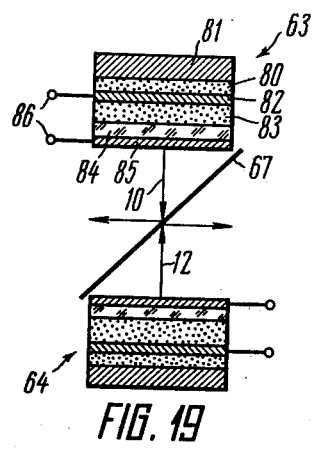

FIG. 19 shows a part of the input conversion unit 6 of the introscope of FIG. 12 comprising a common mirror 67 and fluoroscopic converters 63 and 64 set at an angle of 45° thereto, each of them being made as an X-ray polycrystal screen 80 with a substrate 81 and a solid-state electroluminescent light amplifier. The luminophor layer of the X-ray screen 80 is in contact with the surface of an optically transparent electrode 82 of the solid-state electroluminescent light amplifier which is in contact with a light-sensitive photosemiconductor layer 83 which is in contact with an electroluminophor layer 84, which is in contact with an optically transparent electrode 85. The solid-state electroluminescent light amplifier is connected by means of terminals 86 to a controlled power source (not shown) placed in the remote control unit.

Figure 20:
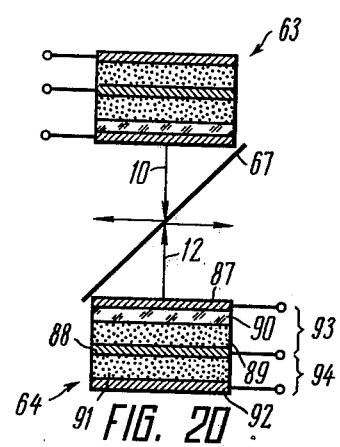

FIG. 20 illustrates a part of the input conversion unit 6 of the introscope of FIG. 12 comprising a common mirror 67 and fluoroscopic converters 63 and 64 of penetrating radiation set at an angle of 45° thereto, each of them being made of a solid-state electroluminescent light amplifier (consisting of optically transparent electrodes 87 and 88 and a light-sensitive photosemiconductor layer 89 and an electroluminophor layer 90 in contact with said electrodes and with one another, its optically transparent electrode 88 being in contact with the photosemiconductor layer 89 and being coated successively by an electrophotoluminescent layer 91 and a light-tight electrode 92).

The solid-state electroluminescent light amplifier and the light-tight electrode 92 are respectively connected by means of terminals 93 and 94 to a controlled power source (not shown) placed in the remote control unit.

Another embodiment of an introscope comprises, according to the invention, substrates of the main fluoroscopic converter 95 (FIG. 21) and additional converter 96 which are made as one common metal substrate 97. The substrate 97 is preferably made from lead (or tungsten or uranium). The thickness of the substrate 97 is about equal to the path length of electrons produced in the metal by the penetrating radiation 2. Employment of the common substrate 97 enables a more complete exploitation of electrons which in the final analyses increases the sensitivity of the introscope.

In the forementioned introscope the converters 95 and 96 (FIG. 22) are made as X-ray polycrystal screens 98 which are then applied to the common metal substrate 97. The mirrors 15 and 16 are set at an angle of 45° to the common substrate 97. Other components of the introscope of FIG. 21 and their connections are analogous to the introscope of FIG. 1.

Figure 21:
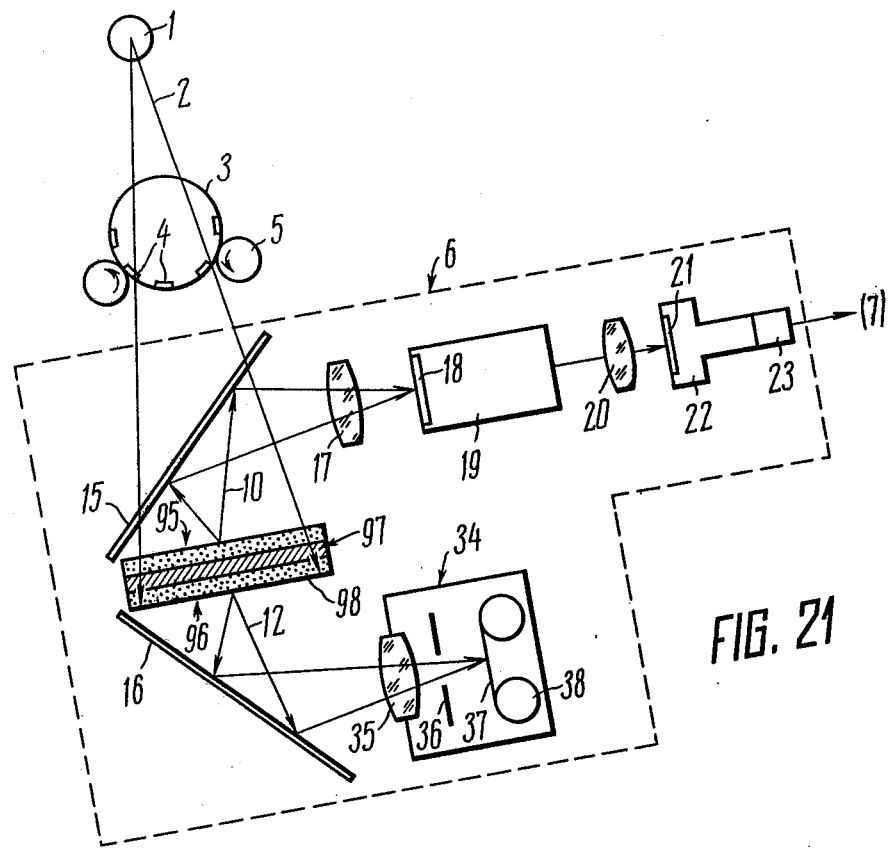
FIG. 21 is a schematic view of still another embodiment of an input conversion unit of an introscope, according to the invention.

Referring to FIGS. 23-27, various embodiments of main and additional fluoroscopic converters of the introscope shown in FIG. 21 comprise substrates made of metal as common substrates.

Figure 23:
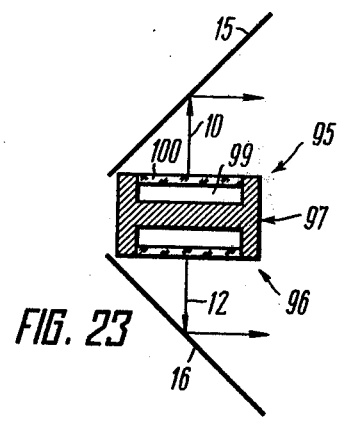
FIGS. 23-27 show various embodiments of main and additional fluoroscopic converters of the introscope of FIG. 21, according to the invention.

Referring to FIG. 23, the main fluoroscopic converter 95 and the additional converter 96 are made of monocrystal scintillating screens 99 with a common metal container, the common container being at the same time a common substrate 97. Other sides of the scintillating screens 99 are in contact with optically transparent outlet windows 100 of the container.

Figure 24:
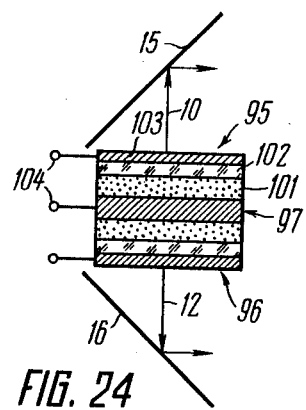

Referring to FIG. 24, the main fluoroscopic converter 95 and the additional converter 96 are made as solid-state electroluminescent X-ray image amplifiers with one common non-transparent electrode, which is a common substrate 97. An X-ray sensitive photosemiconductor layer 101 is applied to the substrate 97 on each side thereof. An electroluminophor layer 102 is in contact with the layer 101 and with an optically transparent electrode 103. The converters are connected by means of terminals 104 to a controlled power source (not shown) placed in the remote control unit.

Figure 22:
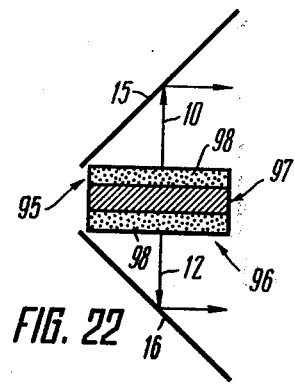
FIG. 22 shows main and additional mirrors and main and additional fluoroscopic converters of the introscope of FIG. 21, according to the invention.
Figure 25:
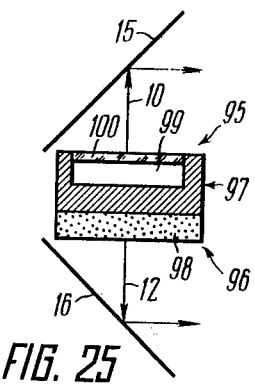
Figure 26:
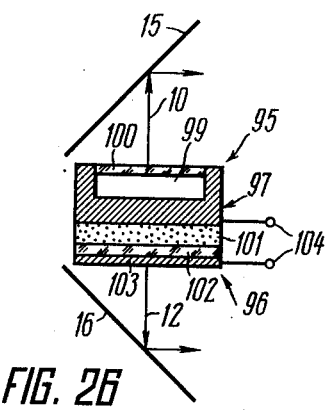

Referring to FIG. 25, the main fluoroscopic converter 95 and the additional converter 96 are made as a monocrystal scintillating screen 99, as shown in FIG. 23, and as an X-ray polycrystal screen 98, as shown in FIG. 22. A part of the container of the scintillating screen 99 positioned across the flux of the penetrating radiation 2 (FIG. 21) serves as a common substrate 97 (FIG. 25) for the screens 98 and 99.

In this case the main fluoroscopic screen may be made as an X-ray polycrystal screen and the additional screen as a monocrystal scintillating screen.

A part of the container of the scintillating monocrystal screen 99 (FIG. 26) which is the main converter 95 and a common substrate 97 serves at the same time as a non-transparent electrode of the solid-state electroluminescent X-ray image amplifier which is the additional fluoroscopic converter 96. A substrate for an X-ray sensitive photosemiconductor layer 101 being in contact with the screen 99 and with an electroluminophor layer 102, said layer 102 being in contact with an optically transparent electrode 103. The solid-state electroluminescent X-ray image amplifier is connected by means of terminals 104 to a controlled power source (not shown) placed in the remote control unit. In this case the main fluoroscopic converter may also be made as a solid-state electroluminescent X-ray image amplifier and the additional converter as a monocrystal scintillating screen.

Figure 27:
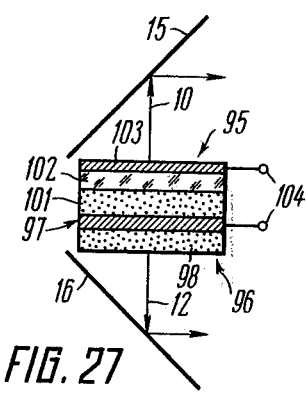

Referring to FIG. 27, a substrate 97 of an X-ray polycrystal screen 98 (FIG. 27) fluorescing under the action of the penetrating radiation 2 (FIG. 21), which is an additional fluoroscopic converter 96, is a non-transparent electrode of the solid-state electroluminescent X-ray image amplifier, as shown in FIG. 24, which is the main fluoroscopic converter 95. It is possible that the X-ray polycrystal screen shown in FIG. 22 be the main fluoroscopic converter of FIG. 27 and the solid-state electroluminescent X-ray image amplifier of FIG. 24 is the additional converter.

Another embodiment of an introscope comprises, according to the invention, a common substrate of the main fluoroscopic converter 95 (FIG. 21) and the additional converter 96 made as a scintillating monocrystal screen 105 (FIG. 28) which serves as another additional fluoroscopic converter with a spectrum of luminescence other than the spectra of luminescence of the main screen 95 and the additional screen 96. Such an embodiment of the introscope creates a color shadow image of the interior of a test object even when penetrating radiation is converted into light, which increases the amount of information on the test object and, consequently, the sensitivity of the introscope.

In this embodiment of an introscope the converters 95 and 96 are made as scintillating monocrystal screens 106, which are in contact on one side with the monocrystal scintillating screen 105 and on the opposite side with an optically transparent outlet window 107. The butt ends of the screens 105 and 106 are enclosed by a non-transparent container 108. Mirrors 15 and 16 are set at an angle of 45° to the monocrystal scintillating screen 105. Other components of the introscope of FIG. 28 and their connections are similar to the introscope of FIG. 21.

Figure 29:
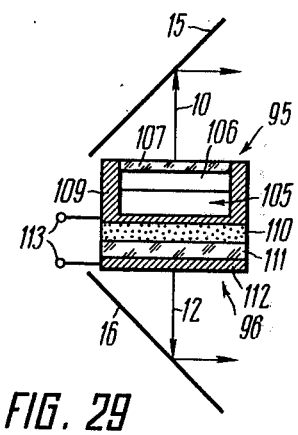
Figure 30:
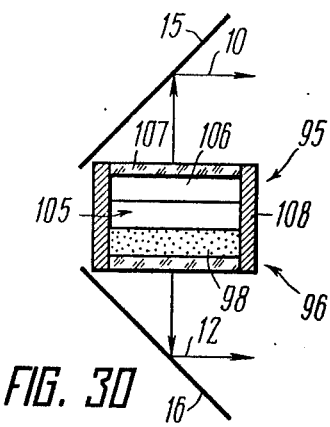

FIGS. 29 and 30 illustrate other embodiments of the main fluoroscopic converter 95 and additional converter 96 wherein a scintillating monocrystal screen is used as a common substrate.

Referring to FIG. 29, the main fluoroscopic converter 95 and additional converter 96 are made respectively as a scintillating monocrystal screen 106, which is in contact by on side with the monocrystal scintillting screen 105 used as a substrate and on the other side with the optically transparent outlet window 107, and a solid-state electroluminescent X-ray image amplifier, its non-transparent electrode 109 being in contact on one side with the monocrystal scintillating screen 105 and being simultaneously a non-transparent container for the screens 105 and 106 and being in contact on the other side with an X-ray sensitive photosemiconductor layer 110, which is in contact with an electroluminophor layer 111, which is in contact with an optically transparent electrode 112. The solid-state electroluminescent X-ray image amplifier is connected by means of terminals 113 to a controlled power source (not shown) placed in the remote control unit.

The main fluoroscopic converter of FIG. 29 may be a solid-state electroluminescent X-ray image amplifier and the additional converter may be a monocrystal scintillating screen.

FIG. 30 shows the additional fluoroscopic converter 96 made as the X-ray polycrystal screen 98 of FIG. 22 and being applied on one side of the monocrystal scintillating screen 105 used as a common substrate. The opposite side of the screen 105 is in contact with the second monocrystal scintillating screen 106, which is in the main fluoroscopic converter 95. Butt ends of the screens 98, 105 and 106 are enclosed by the non-transparent container 108 shown in FIG. 28. The container is provided with optically transparent windows 107 in contact with the screens 98 and 106.

It is possible that the X-ray polycrystal screen of FIG. 30 be the main fluoroscopic converter and that the monocrystal scintillating screen be the additional fluoroscopic converter.

Still another embodiment of the introscope shown in FIG. 21 comprises, according to the invention, main and additional fluoroscopic converters made as one common fluoroscopic converter 114 (FIG. 31) with two optically transparent outlet windows 107. This embodiment of an introscope makes the introscope design simpler, cheaper and more reliable.

The fluoroscopic converter 114 with two optically transparent outlet windows 107 comprises a monocrystal scintillating screen 106 enclosed around its butt end by a non-transparent container 108. Mirrors 15 and 16 are set at an angle of 45° to the optically transparent outlet windows 107 of the fluoroscopic converter 114. Other components of the introscope of FIG. 31 and their connections are similar to the introscope shown in FIG. 21.

In other embodiments (FIGS. 32-37), the main and additional fluoroscopic converters are made as a common fluoroscopic converter with two optically transparent outlet windows as in the introscope shown in FIG. 21.

Figure 32:
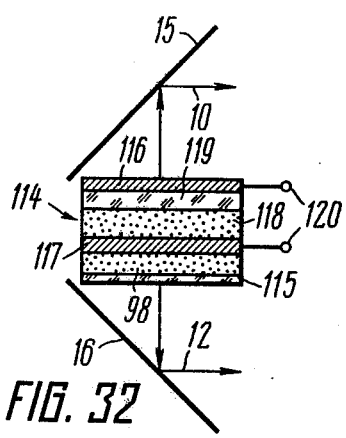

FIG. 32 shows an embodiment of an introscope, wherein a common fluoroscopic converter 114 with two optically transparent outlet windows 115 and 116 (the window 115 is an optically transparent lacquer layer and the window 116 is an output optically transparent electrode) is made up of an X-ray polycrystal screen 98, as shown in FIG. 22, coated upon an input optically transparent electrode 117 of a solid-state electroluminescent light amplifier. Apart from the electrode 117, the converter 114 includes the following components successively contacting each other: a light-sensitive photosemiconductor layer 118, an electroluminophor layer 119 and an output optically transparent electrode. The solid-state electroluminescent light amplifier is connected by means of terminals 120 to a controlled power source (not shown) placed in the remote control unit.

This embodiment of a common fluoroscopic converter causes intensification of the main flux 10 (FIG. 21) of visible light as compared to the additional flux 12 of visible light thus providing conditions for the employment of simpler and cheaper closed-circuit television systems.

When low-sensitivity film is employed in a cinema recorder, the fluoroscopic converter of FIG. 32 may be placed in relation to the mirrors so that the X-ray polycrystal screen faces the main mirror and the output optically transparent electrode faces the additional mirror. This permits a reduction of the film exposure time.

Figure 28:
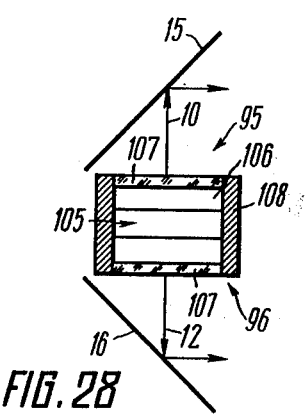
FIGS. 28-30 show embodiments of a main and two additional fluoroscopic converters of the introscope of FIG. 21, according to the invention.
Figure 33:
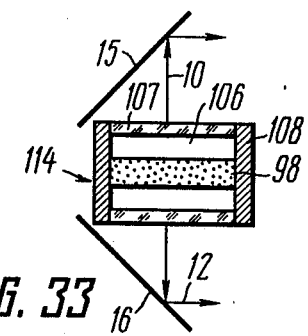

Referring to FIG. 33, this embodiment of an introscope comprises a common fluoroscopic converter 114 with two optically transparent windows 107 made up of two monocrystal scintillating screens 106 as shown in FIG. 28, with different spectra of luminescence and an X-ray polycrystal screen 98, as shown in FIG. 22, positioned therebetween. Said screens 98 and 106 are positioned between the optically transparent windows 107. The screens are enclosed by non-transparent container 108 around their butt ends. This embodiment of the common fluoroscopic converter 114 permits a transformation of the penetrating radiation 2 (FIG. 21) into a color shadow optical image even directly on the common fluoroscopic converter 114 (FIG. 33), which increases the information on the interior of the test object and, consequently, the sensitivity of the introscope.

Figure 34:
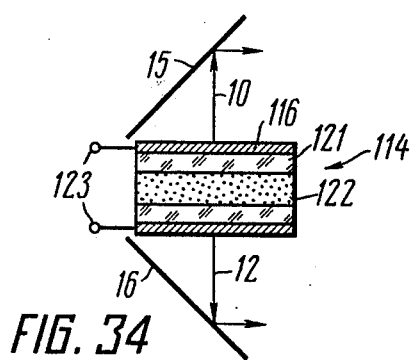

Referring to FIG. 34, this embodiment of an introscope comprises a common fluoroscopic converter 114 with two optically transparent windows 116 composed of two optically transparent electrodes, as shown in FIG. 32, with two electroluminophor layers 121 placed therebetween and an X-ray sensitive photoresistor layer 122 positioned between the layers 121. The fluoroscopic converter 114 of FIG. 34 is connected by means of terminals 123 to a controlled power source (not shown) placed in the remote control unit.

Such fluoroscopic converter permits simultaneous transformation of the penetrating radiation 2 (FIG. 21) into light and its amplification to the required value.

Figure 35:
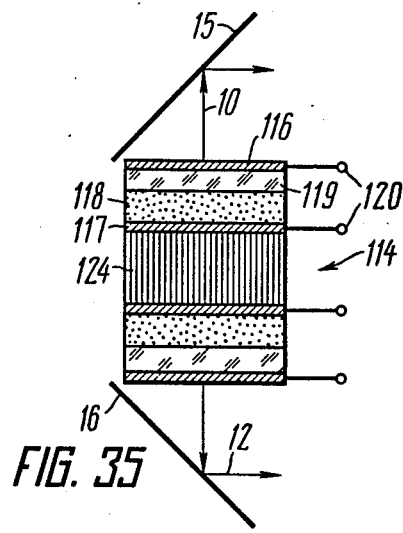

Referring to FIG. 35, another embodiment of an introscope comprises a common fluoroscopic converter 114 made as two solid-state electroluminescent light amplifiers, as shown in FIG. 32, and a screen 124, made of fibres arranged in the direction of propagation of the penetrating radiation 2 (FIG. 21) and scintillating under its influence, place between optically transparent electrodes 117 (FIG. 35) in contact with light sensitive photosemiconductor layers 118. Such a fluoroscopic converters 114 (FIG. 35) simultaneously transforms the penetrating radiation 2 (FIG. 21) into the main flux 10 and additional flux 12 of visible light and amplifies them to the required value.

Figure 36:
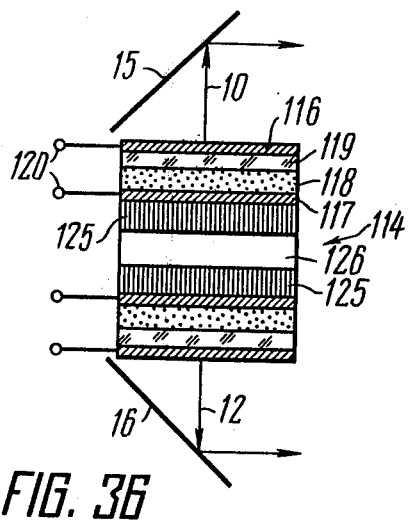
FIGS. 31-37 show embodiments of main and additional fluoroscopic converters made as a common fluoroscopic converter employed as in FIG. 21, according to the invention.

Referring to FIG. 36 another embodiment of an introscope comprises a common fluoroscopic converter 114, its purpose being similar to that of the converter of FIG.

35, made as two solid-state electroluminescent light amplifiers, as shown in FIG. 32, and two fibre glass screens 125 with a monocrystal scintillating screen 126 placed therebetween being positioned between optically transparent electrodes 117 (FIG. 36) which are in contact with light sensitive photosemiconductor layers 118.

Another embodiment of an introscope (illustrated in FIG. 37) comprises a common fluoroscopic converter 114 made as two contacting monocrystal scintillating screens 127 and 128 with different spectra of luminescence, which helps to obtain color image. Screens 127 and 128 are positioned between two optically transparent outlet windows 107, as shown in FIG. 28. The screens are enclosed by a non-transparent container 108 around their butt ends.

Another embodiment of an introscope comprises, according to the invention, a main fluoroscopic converter 129 (FIG. 38), made as a scintillating monocrystal screen 130 positioned in a non-transparent container 131 with two optically transparent windows 132 (inlet) and 133 (outlet), which permits simultaneous recording of the shadow image of the interior of a test object 3 and the external image of this object on the monitor. An additional fluoroscopic converter 134 is made as an X-ray polycrystal screen, as shown in FIG. 14.

An aperture-shutter 135 and an illuminator 136 adjusted from the remote control unit are installed on the outside of the container 131 near the optically transparent inlet window 132. A special powder luminescencing under the effect of an ultraviolet (infrared or visible) radiation flux 137 is rubbed in the surface cracks on the outside surface of the test object 3 presented to the input conversion unit 6 of the introscope. Digits and letters are painted thereon to be used as additional reference marks 138 to the reference marks 4. Other components of the introscope of FIG. 38 and their connections are similar to the introscope of FIG. 12.

Simultaneous recording of a shadow image of the interior of a test object and its outside surface on a monitor television screen is a solution of the problem of exact marking of places on the surface of items, where internal flaws are situated. It also permits simultaneous X-raying and liminescent or color flaw detection, which is important in that it demonstrates the connection between internal and external flaws of the test object. It assists a physician in many instances to be more accurate, e.g. in nethrolithotomy or preparation of a patient for radiotherapy.

Figures 38, 39:
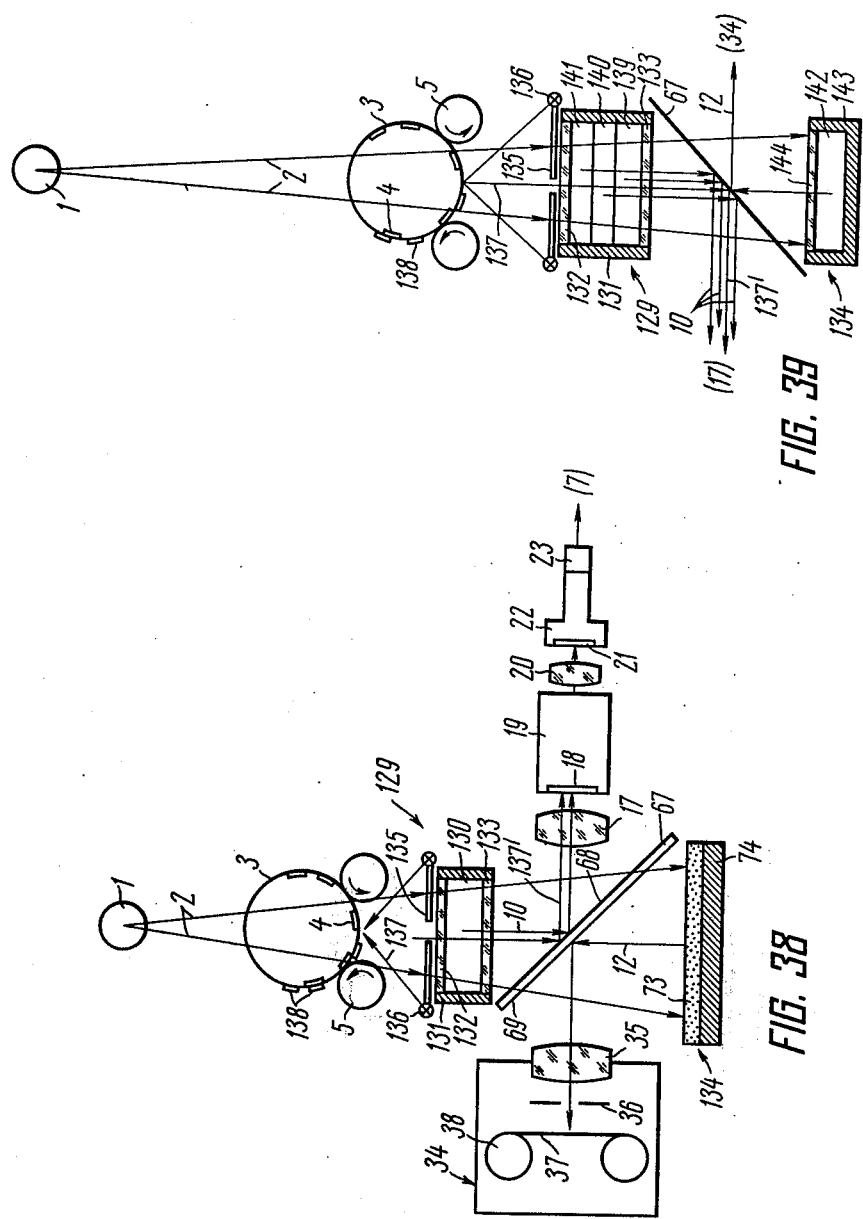
FIG. 38 is a part of a schematic view of the introscope of FIG. 12, wherein the main fluoroscopic converter is made as a scintillating monocrystal screen, according to the Invention.
FIG. 39 is a schematic view similar to FIG. 38, except that the main fluoroscopic converter is made as three scintillating monocrystal screens and an additional converter is made as a scintillating monocrystal screen, according to the invention.

There may be embodiments of an introscope of FIG. 38 wherein the additional fluoroscopic converter is made according to one of the embodiments shown in FIGS. 15-20 and the mirrors are made as in FIG. 11.

Referring to FIG. 39 another embodiment of the introscope shown in FIG. 38 comprises a main fluoroscopic converter 129 made as three monocrystal scintillating screens 139, 140, 141 with different spectra of luminescence placed in a container 131, which ensures simultaneous color of the interior and exterior of a test object 3 and improves the sensitivity of the introscope, when high-energy penetrating radiation is used. An additional fluoroscopic converter 134 is made as a monocrystal scintillating screen 142 placed in a non-transparent container 143 with an optically transparent window 144 provided on the side of the mirror 67, as shown in FIG. 12.

Figure 40:
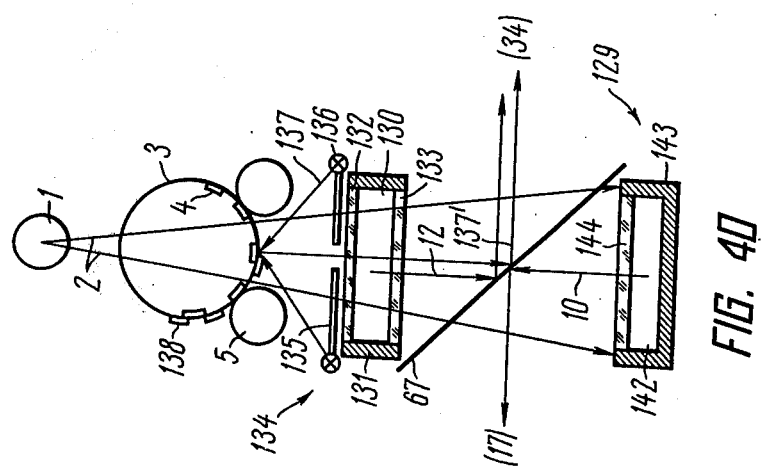
FIG. 40 is a schematic view similar to FIG. 38, except that an additional fluoroscopic converter is made as a scintillating monocrystal screen, according to the invention.

Another embodiment shown in the introscope of FIG. 38 is illustrated in FIG. 40 and comprises a main fluoroscopic converter 129 made as the monocrystal scintillating screen 142 shown in FIG. 39 and an additional converter 134 made as the main fluoroscopic converter shown in FIG. 38. Such an introscope ensures simultaneous recording on one frame of the film in the cinema recorder 34 of both the shadow image of the interior of the test object 3 and the image of the outside structure of said test object 3. Cinema film can be kept as evidence for many years.

There can be embodiments of the introscope of FIG. 40 wherein the main fluoroscopic converter is made according to one of the embodiments shown in FIGS. 15-20.

Figure 41:
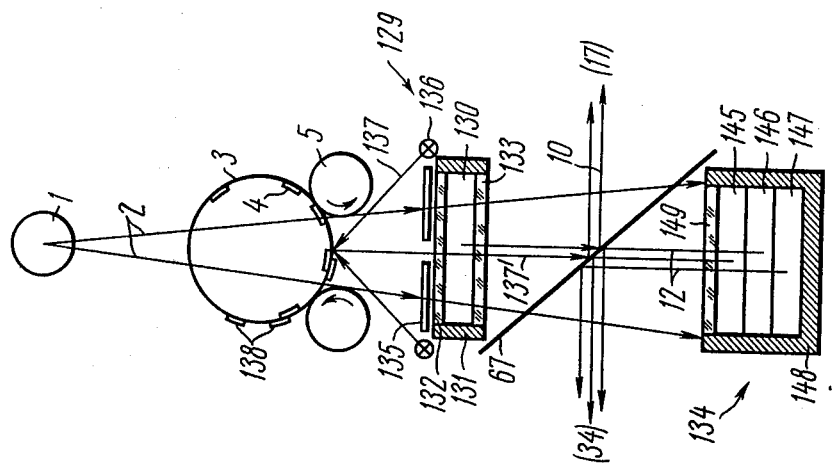
FIG. 41 is a schematic view similar to FIG. 38, except that an additional converter is made as three scintillating monocrystal screens, according to the invention.

Referring to FIG. 41, another embodiment of the introscope shown in FIG. 38 comprises an additional fluoroscopic converter 134 made as three monocrystal scintillating screens 145, 146 and 147 with different spectra of luminescence placed in a container 148 with an optically transparent outlet window 149 which ensures a color shadow image of the interior of a test object 3 on the film of the cinema recorder 34.

Figure 42:
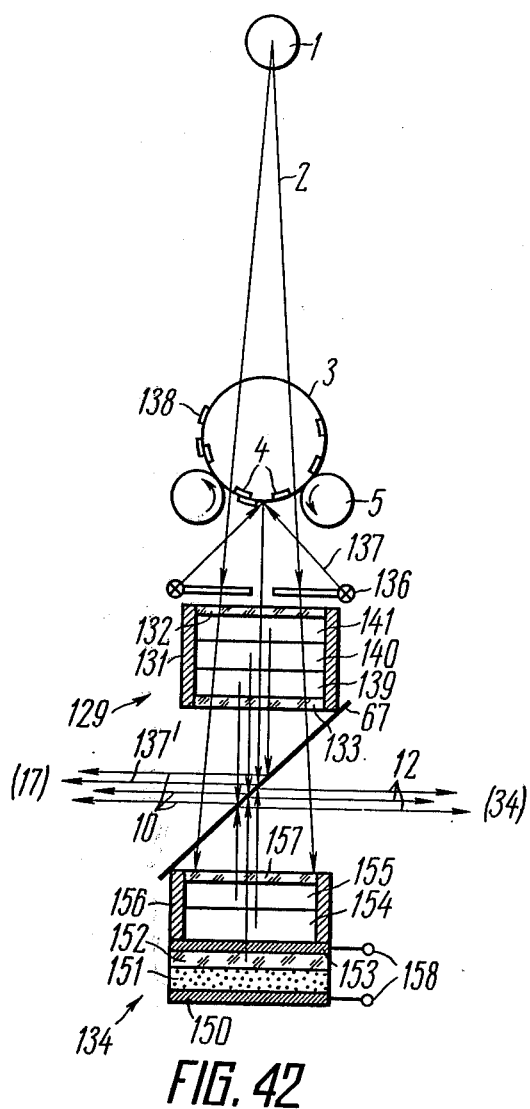
FIG. 42 is a schematic view similar to FIG. 39, except that another embodiment of an additional fluoroscopic converter is used, according to the invention.

Referring to FIG. 42, the introscope shown in FIG. 39 comprises an additional fluoroscopic converter 134 including a solid-state electroluminescent X-ray image amplifier composed of successively contacting portions namely: a non-transparent electrode 150, an X-ray sensitive photosemiconductor layer 151, an electroluminophor layer 152, an optically transparent electrode 153, the optically transparent electrode 153 being in contact with scintillating monocrystal screens 154 and 155, which are in contact with each other, placed in a non-transparent container 156 provided with an optically transparent outlet window 157. The solid-state electroluminescent X-ray image amplifier is connected by terminals 158 to a controlled power source (not shown) placed in the remote control unit. Such an introscope making it possible to obtain color images of the interior and exterior of the test object 3 on the monitor and color shadow image of the interior of the test object 3 on the film of the cinema recorder 34.

Though the embodiments of an introscope depicted in FIGS. 1-42 employ as main and additional converters only X-ray polycrystal screens, solid-state electroluminescent X-ray image amplifiers, solid-state electrophotoluminescent light amplifiers and monocrystal scintillating screens of one or different spectra of luminescence source, other types of converters can, according to the invention, be used: such as various solid, liquid and gas scintillators, monocrystal and polycrystal screens converting all types of penetrating radiation into visible light within a wide energy range: X-ray and braking radiation, neutrons, protons, alphaparticles, since an introscope may be provided with one or another source depending on the thickness and material of the test object and other conditions.

The principle of operation of an introscope will be described in detail with reference to the embodiment of the introscope shown in FIG. 1.

The penetrating radiation 2 is emitted by the source 1 (gamma radiation source) and reduced by the test object 3 moved on the rollers 5 of the tilter and the reference marks 4 set therein in proportion to their thickness and density. As a result the penetrating radiation 2 is converted into an invisible shadow gamma image of the interior of the test object 3 which passes practically unattenuated through the mirror 15 and is completely absorbed in the main fluoroscopic converter 9 and the additional converter 11, wherein the penetrating radiation 2 is transformed respectively into the main flux 10 and additional flux 12 of visible light carrying information on the shadow optical image of the interior of the test object 3.

The main flux 10 of visible light produced by the main fluoroscopic converter 9 is reflected by the mirror 15 in the direction of the reflective objective 17 by which the optical shadow image of the interior of the test object 3 is transferred from the main fluoroscopic converter 9 to the photocathode 18 of the image converter 19, wherein the optical image is transformed into a flow of electrons distributed in the plane of the photocathode 18 in conformity with the brighness of the optical image, amplified and converted back into an optical image at the output of the image converter 19.

The optical image is transferred from the output of the image converter 19 by means of a high-power objective 20 to the photocathode 21 of the pickup television tube 22 by which the optical shadow image of the interior of the test object 3 is converted into an electrical television signal that is (a video signal).

The video signal is fed from the output of the pickup television tube 22 to the input of the preamplifier 23 positioned in the input conversion unit 6 of the introscope. The video signal is then supplied from the output of the preamplifier 23 along the network of the closed-circuit television system to the input of the unit 7 of intermediate video signal amplification and processing and from its output the video signal is again fed along the television network to the input of the remote control unit 26 and then to the television screen 25 of the monitor display unit 24, the input of the video recorder 27 and to the input of the unit 28 of parallel cinema recording of the television image placed in the control board 8.

The video signal is tape recorded in the video recorder 27 and then transformed into an optical shadow image of the interior of the test object 3 on the television screen 25 of the monitor display unit 24 and in the kinescope 29 of the unit 28 of parallel cinema recording of the television image.

The optical image is transferred from the screen of the kinescope 29 of the unit 28 of parallel television image cinema recording by means of the apertured objective 30 through the open shutter 31 onto the film 32 moved by the film transporting mechanism 33. The film 32 records the television image from the screen of the kniescope 29.

The additional flux 12 of visible light produced by the additional fluoroscopic converter 11 is reflected by the mirror 16 in the direction of the apertured reflector lens 35 of the cinema recorder 34 (the mirror 16 and the cinema recorder 34 are situated in the input conversion unit 6 of the introscope).

The optical shadow image of the interior of the test object 3 is transferred by means of the lens 35 from the additional fluoroscopic converter 11 through the open shutter 36 onto the film 37. The film 37 records the optical image from the additional fluorscopic converter 11. The film 37 is moved by the film transportation mechanism 38.

The unit 28 of parallel television image cinema recording and the cinema recorder 34 operate synchronously immediately after the penetrating radiation source 1 is turned on by the remote control unit 26. The shutters 31 and 36 and film transportation mechanisms 33 and 38 are controlled by frames automatically at a distance by the remote control unit 26. The operator switches on and off through the unit 26 the image converter 19 and the video recorder 27, as well as remotely controlling the rollers 5 of the tilter.

After the films 32 and 37 (FIG. 3) are processed and dried, they are simultaneously displayed in the matching device 39. The films 32 and 37 are placed in the framer 41 and lighted uniformly by means of the illuminator 40. Matching of frames is effected by the reference marks 4 which can be seen on the films.

Comparison of similar frames of the films 32 and 37 (FIG. 1) assists the operator to in eliminating all doubts which may appear after seeing the television transmission of the radioscopy of the test object 3 since the film 37 contains none of the noises accompanying the operation of the image converter 19 and the pickup television tube 22 and resolution of less prominently contrasted details of the image is improved due to the property of the film 37 to accumulate information and increase the image contrast. The cinema recorder 34 makes the sensitivity of the introscope many times higher.

The film 37 is the basic document to be produced to the customer on delivery of an item. The video recording is reviewed for a second time for operational control. Availability of the video recorder 27, the unit 28 of parallel television image cinema recording and the cinema recorder 34 ensures flaw detection at high speeds of movement of the test object, reduces nervous strain and provides comfortable conditions for an operator. The closed-circuit television system ensures total radiological safety when dealing with penetrating radiation with an energy of about 1-35 MeV.

The introscope of FIG. 1 used as the main and additional fluoroscopic converters 9 and 11 X-ray polycrystal screens 13 with contacting substrates 14 (FIG. 2), their conversion of penetrating radiation into light changes with a change growth in the radiation energy.

With the energy increased from 0.15 MeV to 35 MeV absorption of the penetrating radiation in a thin layer of luminophor is sharply decreased. That is why to raise the effectiveness of conversion of the penetrating radiation into light monocrystal scintillating screens (FIG. 4) and fluoroscopic converters with a metal substrate (FIGS. 2 and 5–10) are employed when the energy of the penetrating radiation is within this energy range.

In fluoroscopic converters featuring metal substrates the penetrating radiation is converted by the metal substrate (elements 14,43,45,60) into electron flows which are recorded by the luminophor layer of the screen 13, the scintillating screen 42, the photosemiconductor layer 46, the electrophotoluminescent layer 59, which in their turn convert the electron flows into visible light. The brightness and contrast of the optical image at the outputs the fluoroscopic converters shown in FIGS. 5 and 7–10 are changed, either increasing or decreasing, by changing the voltage across the terminals 49, 54 and 61, 62 respectively of the solid-state electroluminescent X-ray image amplifier and the solid-state electroluminescent light amplifier. Voltage is controlled by adjusting the power source (not shown) positioned in the unit 26 (FIG. 1) for remote control. Very weak penetrating radiation can be recorded by raising the brightness and contrast at the output of said fluoroscopic converters.

With an energy of up to 0.05–0.15 MeV the luminophor layer constituting the screen actually becomes the converter of the penetrating radiation. That is why with such energies X-ray polycrystal screens on cardboard or plastic substrates can be employed as the main and additional fluoroscopic converters.

In the introscope embodiment shown in FIG. 11 the penetrating radiation 2 is partially absorbed by the main fluoroscopic converter 63 and the mirrors 65 and 66 and comes to the additional fluoroscopic converter 64. The main flux 10 of visible light produced by the converter 64 is reflected by the mirror 66 in the direction of the reflector lens 17 by which the optical shadow image of the interior of the test object 3 is transferred from the fluoroscopic converter 64 to the photocathode 18 of the image converter 19. The additional flux 12 of visible light produced by the fluoroscopic converter 63 is reflected by the mirror 65 in the direction of the cinema recorder 34. The image converter 19, the cinema recorder 34 and other components of the introscope operate similarly to the respective components of the introscope shown in FIG. 1.

In the introscope embodiment of FIG. 12 the penetrating radiation 2 is partially absorbed by the main fluoroscopic converter 63 and the common mirror 67 and comes to the additional fluoroscopic converter 64.

The main flux 10 of visible light produced by the main fluoroscopic converter 63 is reflected by the reflecting surface 68 of the mirror 67 in the direction of the reflector lens 17. The additional flux 12 of visible light produced by the additional fluoroscopic screen 64 is reflected by the reflecting surface 69 of the mirror 67 in the direction of the cinema recorder 34. The reflector lens 17, the cinema recorder 34 and other components of the introscope operate similarly to the respective components of the introscope shown in FIG. 1.

The main and additional fluoroscopic converters 63 and 64 shown in FIGS. 13-20 operate similarly to the main and additional fluoroscope converters 9 and 11 of FIGS. 2 and 4-10.

In the introscope embodiment shown in FIG. 21 the penetrating radiation 2 passes through the mirror 15 and comes to the main and additional fluoroscopic converters 95 and 96 and their common metallic substrate 97. The main and additional converters 95 and 96 convert the penetrating radiation 2 respectively into the main and additional fluxes 10 and 12 of visible light which are amplified by the fluoroscopic converters 95 and 96 transforming electrons produced in the metallic substrate 97 under the influence of the penetrating radiation 2. Further operation of the introscope shown in FIG. 21 is similar to the operation of the introscope shown in FIG. 1.

The main and additional fluoroscopic converters 95 and 96 shown in FIGS. 22-27 operate similarly to the main and additional fluoroscopic converters 9 and 11 shown in FIGS. 2 and 4-8.

When converters shown in FIGS. 28-30 are employed in the introscope shown in FIG. 21, there are several common operations: recording of the penetrating radiation 2 simultaneously by the main and additional fluoroscopic converters 95 and 96 and the monocrystal scintillating screen 105 and transformation of the penetrating radiation into the main and additional fluxes 10 and 12 of visible light thereby, which are further recorded similarly to the recording of the light fluxes 10 and 12 in the introscope shown in FIG. 1.

The difference in operations lies in that in the introscope shown in FIG. 28 the main and additional light fluxes 10 and 12 are produced simultaneously by three monocrystal scintillating screens (the screen 105 and two screens 106), whereas in the introscopes shown in FIGS. 29 and 30 the main light flux 10 is produced by two monocrystal scintillating screens 105 and 106 (an additional X-ray polycrystal screen 98 is provided in the introscope shown in FIG. 30) and the additional visible light flux 12 is produced by a solid-state electroluminescent X-ray image amplifier in the introscope shown in FIG. 29, and an X-ray polycrystal screen 98 in the introscope of FIG. 30. In the introscope of FIGS. 28-30 the main flux 10 shown in visible light and the additional flux 12 shown in visible light in the introscope of FIG. 28 carry information on color shadow image of the interior of the test object, whereas the additional flux 12 of visible light in the introscopes of FIGS. 29-20 carries a black-white shadow image.

Figure 37:
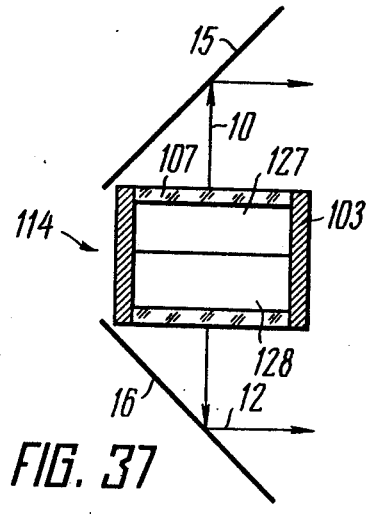
Figure 31:
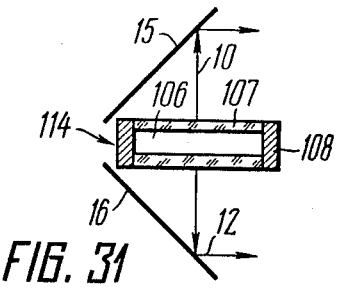

Common operations of the introscope shown in FIG. 21, wherein the converters of FIGS. 31-37 are employed, are: recording of the penetrating radiation 2 by one fluoroscopic converter (the monocrystal scintillating screen 106 in the introscope of FIG. 31, the X-ray polycrystal screen 98 in the introscopes of FIGS. 32 and 33, the X-ray sensitive photoresistor layer 122 in the introscope shown in FIG. 34, the screen 124 made of fibres scintillating under the effect of penetrating radiation in the introscope shown in FIG. 35, the monocrystal scintillating screens 126 and 127 in the introscopes shown in FIGS. 36 and 37 respectively) and conversion of the penetrating radiation 2 thereby into the main and additional fluxes 10 and 12 of visible light which are further recorded similarly to the recording of the light fluxes 10 and 12 of the introscope shown in FIG. 1.

The difference in operations is that in the introscope shown in FIG. 32 the main flux 10 of visible light is amplified by a solid-state electroluminescent light amplifier, the voltage across its terminals 120 being rotatably controlled by adjusting the power source (not shown).

In the introscope shown in FIG. 33 transformation of the penetrating radiation 2 and generation of the main and additional fluxes 10 and 12 of visible light are performed simultaneously by the X-ray polycrystal screen 98 and two monocrystal scintillating screens 106. They produce together with the X-ray polycrystal screen color shadow images of the interior of the test object carried by the fluxes 10 and 12 of visible light.

In the introscope shown in FIG. 34 the photoconduction current produced in the X-ray sensitive photoresistor layer 122, when penetrating radiation is converted, is redistributed between the photoresistor layer 122 and the electroluminophor layer 121 according to their inner resistance. They convert the photoconduction current into visible light of fluxes 10 and 12 which emerge through the optically transparent electrodes 116. The voltage across the terminals 123 is changed by adjusting the power source (not shown).

The voltage is changed in the same way across the terminals 120 (FIGS. 35, 36) of the solid-state electroluminescent light amplifiers which intensify the main and additional fluxes 10 and 12 of visible light generated in the screen 125 (FIG. 35) by fibres scintillating under the action of penetrating radiation and at the output of the fibreglass screens 125 (FIG. 36) carrying visible light from the monocrystal scintillating screen 126.

In the introscope of FIG. 37 the main and additional fluxes 10 and 12 of visible light are intensified by the light converted under the action of penetrating radiation in the monocrystal scintillating screen 128. The fluxes 10 and 12 recorded directly from the monocrystal scintillating screens 127 and 128 produce color shadow images of the interior of the test object.

With the fluoroscopic converters 129 and 134 (FIGS. 38–39, 41–42) the introscope operates identically to the introscope shown in FIG. 12 with the exception of the following operations.

The fluoroscopic converter 129 (FIG. 38) simultaneously converts the penetrating radiation 2 into the flux 10 of visible light and passes through itself the flux 137' of visible light from the surface of the test object 3 which is produced by illuminating the outer surface of the test object 3 with additional reference marks 138 printed thereon by the illuminator 136. The fluxes 10 and 137' of visible light are reflected by the mirror 67 in the direction of the reflector lens 17 which simultaneously transfers the shadow images of the interior of the test object 3 from the fluoroscopic converter 129 and the image of the outward structure of the test object 3 to the photocathode 18 of the image converter 19.

Sharpness and contrast of pictures are controlled by changing the brightness of the illuminator 136 and the power of the source 1 of penetrating radiation 2. The surplus of flux 137' of visible light from the outer surface of the test object 3 is reduced by adjusting the aperture 135.

The shadow image of the interior of the test object and the image of its outward structure can be recorded separately by employing pulsed operation of the penetrating radiation source or by alternately closing and opening the aperture.

The operation of the introscope shown in FIG. 39 and FIGS. 41–42 is similar to the operation of the introscope shown in FIG. 38 except that the fluoroscopic converters 129 (FIGS. 39 and 42) and 134 (FIGS. 41 and 42) transform the penetrating radiation 2 into respectively the main and additional fluxes 10 and 12 of visible light and at the same time produce a shadow color image of the interior of the test object 3 since each of the monocrystal scintillating screens 139, 140, 141, 145, 146, 147, 154, 155 and the solid-state electroluminescent X-ray image amplifier of FIG. 42 are luminesced by a different spectrum of visible light. The fluoroscopic converter 134 (FIG. 39) operates analogously to the additional fluoroscopic converter 64 shown in FIG. 15.

The operation of the introscope shown in FIG. 40 is similar to the operation of the introscope shown in FIG. 38 except that the fluoroscopic converter 129 operates analogously to the main fluoroscopic converter 63 shown in FIG. 18 and the fluoroscopic converter 134 operates analogously to the fluoroscopic converter 129 shown in FIG. 38.

Employment of the introscopes shown in FIGS. 38–42 permits simultaneous luminescent testing of the object and its radioscopy by penetrating radiation which has never before been done at the same time.

In this case, according to the procedure of luminescent testing, a layer of a substance luminescing under the effect of ultraviolet light is rubbed into the surface of the test object 3 until a pattern is obtained due to surface irregularities (additional reference marks 138). The test object is then put on the rollers 5 of the tilter between the source 1 of the penetrating radiation 2 and the front of the optically transparent windows of the fluoroscopic converter 129 (FIG. 38). The object is then simultaneously examined by the penetrating radiation 2 and illuminated by the illuminator 136. The outward structure image of the test object 3 and the shadow image of the interior of said test object 3 passing through the fluoroscopic converter 129 are simultaneously recorded on the film 37 of the cinema recorder 34 or on the television screen 25 of the monitor display unit 24. The results of a comparison of these images help to determine the location of flaws inside and on the surface of the test object 3 and the correlation between the inner and surface flaws, which has not been possible before.

Simultaneous observation of a shadow image of the interior of a test object and its outward structure opens up new possibilities for radiotherapy and diagnosis, and complicated heart and kidney operations.

Cinema recording from a fluoroscopic converter permits a 5–6 fold increase of the flaw-detecting sensitivity of an introscope by employing specific features of a cinema film (capability to accumulate images, films with high contrast coefficient). At the same time it becomes possible to step up the speed of the test object movement. This offers considerable scope for employment of introscopes in industry not only for radiological flaw detection but for investigation of high-rate processes.

In the description of proposed embodiments of the invention concrete terms of narrow specification were used for the sake of clarity. But the invention is not confined to the terms used and it should be kept in mind that each of the terms embraces all equivalent elements similarly operating for the same purposes.

Though the present invention is described with a preferred embodiment it is understood that variants and changes may take place without deviating from the idea and scope of the invention by all those skilled in the art.

These variations and changes are not considered to be outside the volume and essence of the invention and appended Claims.

What is claimed is:

1. An introscope comprising:
 a source of radiation generating a flow of penetrating radiation which passes through a tested object with reference marks set thereon;
 a first fluoroscopic converter having a certain spectrum of luminescence which is positioned in the path of said penetrating radiation after said test object and which transforms said penetrating radiation into a first flux of visible light which contains information on the shadow interior of said test object;
 a first mirror placed in relation to the first fluoroscopic converter so that it receives the first flux of visible light transmitted from said first fluoroscopic converter;
 a lens positioned so that it receives the first flux of visible light reflected from the first mirror;
 an image converter positioned so that the first flux of visible light reflected from the first mirror comes through said lens and into said image converter, said image converter amplifying said first flux of visible light;
 a closed-circuit television system positioned so that it receives the first flux of visible light amplified in said image converter;
 a pickup television tube of said closed-circuit television system having a photocathode, which is the input element of this system, said photocathode receives the first flux of visible light after it is amplified in the image converter and amplifies said flux;

a unit of intermediate video signal amplification and processing having an input and an output and being connected by its input to said pickup tube;

a monitor display unit of said closed-circuit television system having an input and a television screen and being connected by its input to said output of said unit of intermediate videosignal amplification and processing, said television screen records the shadow image of said interior of said test object;

a second fluoroscopic converter having a spectrum of luminescence other than said spectrum of luminescence of the first fluoroscopic converter which is positioned in the path of said penetrating radiation after said test object parallel to the first fluoroscopic converter so that it also receives said penetrating radiation and which transforms said penetrating radiation into a second flux of visible light which contains information on the shadow interior of said test object;

a second mirror positioned in relation to the second fluoroscopic converter so that it receives the second flux of visible light transmitted from second fluoroscopic converter;

a cinema recorder having a film and being positioned so that it receives the second flux of visible light reflected from the second mirror, said film records the shadow image of the interior of said test object and serves to correct by said reference marks the shadow image of the interior of said test object obtained simultaneously on said television screen of said monitor display unit; and a remote control unit for controlling said radiation source, said image converter and said cinema recorder.

2. An introscope as claimed in claim 1 wherein; said first fluoroscopic converter includes a substrate; and said second fluoroscopic converter includes a substrate which is in contact with said substrate of the first converter.

3. An introscope as claimed in claim 1, wherein adjacent surfaces of the first and second mirrors are in contact.

4. An introscope as claimed in claim 1, wherein the first and the second fluoroscopic converters are made as one common fluoroscopic converter having first and second optically transparent outlet windows.

5. An introscope as claimed in claim 1, wherein the first and second fluoroscopic converters are made as scintillating monocrystal screens enclosed in containers which serve at the same time as substrates of said fluoroscopic converters.

6. An introscope as claimed in claim 1, wherein the first and second fluoroscopic converters are made as X-ray polycrystal screens coated on substrates.

7. An introscope as claimed in claim 2, wherein said substrate of the first fluoroscopic converter and said substrate of the second fluoroscopic converter are made as one common substrate.

8. An introscope as claimed in claim 2, wherein said substrate of the first fluoroscopic converter and said substrate of the second fluoroscopic converter are made from a metal chosen from the group consisting of lead, tungsten and uranium; the total thickness of said substrates being equal to the path length of electrons produced in said metal under the influence of said penetrating radiation.

9. An introscope as claimed in claim 2, wherein the first and second mirrors are set at an angle of 45° to said substrates of the first and second fluoroscopic converters respectively.

10. An introscope as claimed in claim 1, wherein the first and second fluoroscopic converters are made as solid-state electroluminescent X-ray image amplifiers.

11. An introscope as claimed in claim 1, wherein the first fluoroscopic converter is made as a scintillating monocrystal screen; and the second fluoroscopic converter is made as an X-ray polycrystal screen.

12. An introscope as claimed in claim 1, wherein the first fluoroscopic converter is made as an X-ray polycrystal screen; and the second fluoroscopic converter is made as a scintillating monocrystal screen.

13. An introscope as claimed in claim 1, wherein the first fluoroscopic converter is made as a scintillating monocrystal screen; and the second fluoroscopic converter is made as a solid-state electroluminescent X-ray image amplifier.

14. An introscope as claimed in claim 1, wherein the first fluoroscopic converter is made as a solid-state electroluminescent X-ray image amplifier; and the second fluoroscopic converter is made as a scintillating monocrystal screen.

15. An introscope as claimed in claim 3, wherein the first and second mirrors are made as one common mirror having a first and a second reflecting surfaces.

16. An introscope as claimed in claim 3, wherein the first and the second fluoroscopic converters are made as X-ray polycrystal screens coated on substrates.

17. An introscope as claimed in claim 3, wherein each of said first and second fluoroscopic converters comprises; an X-ray polycrystal screen coated on said substrate; a solid-state electroluminescent light amplifier in contact with said screen; said solid-state electoluminescent light amplifier comprising a first optically transparent electrode contacting said X-ray polycrystal screen, a light sensitive photosemiconductor layer coated on said first optically transparent electrode, an electroluminophor layer coated on said photosemiconductor layer, a second optically transparent electrode coated on said electroluminophor layer.

18. An introscope as claimed in claim 3, wherein each of said first and second fluoroscopic converters comprises: a solid-state electroluminescent light amplifier with a first optically transparent electrode, an electroluminophor layer coated on said first optically transparent electrode, a light sensitive to said visible light photosemiconductor layer coated on said electroluminophor layer, a second optically transparent electrode coated on said photosemiconductor layer, an electrophotoluminescent layer coated on said second optically transparent electrode, and an optically nontransparent electrode coated on said electrophotoluminescent layer.

19. An introscope as claimed in claim 3, wherein the first fluoroscopic converter is made as at least one scintillating monocrystal screen having first and second optically transparent outlet windows which permits simultaneous recording of both said shadow image of the interior of said test object and the image of the outside structure of said test object on said television screen of said monitor display device or on said film of said cinema recorder.

20. An introscope as claimed in claim 4, wherein the first and the second fluroscopic converters are made as X-ray polycrystal screens coated on substrates.

21. An introscope as claimed in claim 4, wherein said commom fluoroscopic converter comprises: a first solid-state electroluminescent light amplifier including a first optically transparent electrode, a first electroluminophor layer coated on said first optically transparent electrode, a first light sensitive photosemiconductor layer coated on said first electroluminophor layer, a second optically transparent electrode coated on said first photosemiconductor layer; a screen made of fibres scintillating under the action of said penetrating radiation and having first and second ends, the first ends being in contact with said second optically transparent electrode; a second solid-state electroluminescent light amplifier with a third optically transparent electrode, its surface being in contact with the second ends of said fibres; a second light sensitive photosemiconductor layer coated on said third optically transparent electrode, a second electroluminophor layer coated on said second photosemiconductor layer, a fourth optically transparent electrode coated on said second electroluminophor layer.

22. An introscope as claimed in claim 4, wherein said common fluoroscopic converter comprises: a first solid-state electroluminescent light amplifier with a first optically transparent electrode, a first electroluminophor layer coated on said first optically transparent electrode, a first light sensitive photosemiconductor layer coated on said first electroluminophor layer, a second optically transparent electrode coated on said first photosemiconductor layer; a first fibre glass screen, its glass fibres having first and second ends and said first ends being in contact with said second optically transparent electrode; a monocrystal scintillating screen having by one surface in contact with the second ends of said glass fibres; a second fibre glass screen, its glass fibres having first and second ends and said first ends being in contact with the other surface of said monocrystal scintillating screen; a second solid-state electroluminescent light amplifier comprising a third optically transparent electrode which is in contact with the second ends of glass fibres of the second fibreglass screen and a second light sensitive photosemiconductor layer coated on said third optically transparent electrode, a second electroluminophor layer coated on said second photosemiconductor layer, a fourth optically transparent electrode coated on said second electroluminophor layer.

23. An introscope as claimed in claim 4, wherein said common fluoroscopic converter comprises: a first optically transparent electrode; a first electroluminophor layer coated on said first optically transparent electrode; an X-ray sensitive photoresistor layer coated on said first electroluminophor layer; a second electroluminophor layer coated on said photoresistor layer; a second optically transparent electrode coated on said second electroluminophor layer.

24. An introscope as claimed in claim 4, wherein said commom fluoroscopic converter comprises: a first optically transparent outlet window; a first scintillating monocrystal screen with a certain spectrum of luminescence having one of its surfaces in contact with said first window; an X-ray polycrystal screen having one of its surfaces in contact with the other surface of said first scintillating monocrystal screen; a second scintillating monocrystal screen with a spectrum of luminescence other than that of said spectrum of luminescence of the first monocrystal screen and having one of its surfaces in contact with the other surface of said X-ray screen; a second optically transparent outlet window having one of its surfaces in contact with the other surface of the second monocrystal screen.

25. An introscope as claimed in claim 1, wherein the first fluoroscopic converter is made as an X-ray polycrystal screen; and the second fluoroscopic converter is made as a solid-state electroluminescent X-ray image amplifier.

26. An introscope as claimed in claim 1, wherein the first fluoroscopic converter is made as a solid-state electroluminescent X-ray image amplifier; and the second fluoroscopic converter is made as an X-ray polycrystal screen.

27. An introscope as claimed in claim 1, wherein each of said first and second fluoroscopic converters comprises: an X-ray polycrystal screen coated on a substrate; a solid-state electroluminescent light amplifier in contact with screen; said solid-state electroluminescent light amplifier comprising a first optically transparent electrode contacting said X-ray polycrystal screen, light sensitive photosemiconductor layer coated on said first optically transparent electrode, an electroluminophor layer coated on said photosemiconductor layer, a second optically transparent electrode coated on said electroluminophor layer.

28. An introscope as claimed in claim 1, wherein each of said first and second fluoroscopic converters comprises: a solid-state electroluminescent light amplifier comprising a first optically transparent electrode, an electroluminophor layer coated on said first optically transparent electrode, a photosemiconductor layer sensitive to said visible light coated on said electroluminophor layer, a second optically transparent electrode coated on said photosemiconductor layer; an electrophotoluminescent layer coated on said second optically transparent electrode; an optically non-transparent electrode coated on said electrophotoluminescent layer.

29. An introscope as claimed in claim 7 comprising a third fluoroscopic converter with a spectrum of luminescence other than said spectra of luminescence of the first and the second fluoroscopic converters and being made as a scintillating monocrystal screen which is said substrates of the first and the second fluroscopic converters.

30. An introscope as claimed in claim 7, wherein the first and the second mirrors are set at an angle of 45° to said common substrate of said first and second fluoroscopic converters.

31. An introscope as claimed in claim 9, wherein the first and the second fluoroscopic converters are made as X-ray polycrystal screens coated on said substrates.

32. An introscope as claimed in claim 15, whrein the first fluoroscopic converter is made as at least one scintillating monocrystal screen provided with first and second optically transparent outlet windows, which permits simultaneous recording of both said shadow image of the interior or said test object and the image of the outward structure of said test object on said television screen of said monitor or said film of said cinema recorder.

33. An introscope as claimed in claim 19, wherein the second fluoroscopic converter comprises at least one scintillating monocrystal screen.

34. An introscope as claimed in claim 30, wherein the first and the second fluoroscopic converters are made as X-ray polycrystal screens coated on the respective sides of said common substrate.

35. An introscope as claimed in claim 32, wherein the second fluoroscopic converter is made as at least one scinitillating monocrystal screen.

36. An introscope as claimed in claim 33, wherein the second fluoroscopic converter comprises a solid-state electroluminescent X-ray image amplifier comprising an optically transparent electrode having one of its surfaces in contact with said scintillating monocrystal screen, an electroluminophor layer coated on the other surface of said optically transparent electrode, an X-ray sensitive photosemiconductor layer coated on said electroluminophor layer, an optically non-transparent electrode coated on said photosemiconductor layer.

37. An electroscope as claimed in claim 35, wherein the second fluoroscopic converter comprises a solid-state electroluminescent X-ray image amplifier comprising an optically transparent electrode having one of its surfaces in contact with said scintillating monocrystal screen, an electroluminophor layer coated on the other surface of said optically transparent electrode, an X-ray sensive photosemiconductor layer coated on said electroluminophor layer, an optically non-transparent electrode coated on said photosemiconductor layer.

* * * * *